United States Patent
Didier et al.

(10) Patent No.: US 11,676,233 B2
(45) Date of Patent: Jun. 13, 2023

(54) METHOD OF GENERATING A SET OF ITINERARIES BY LIMITED QUERYING OF DATABASES

(71) Applicant: AMADEUS S.A.S., Biot (FR)

(72) Inventors: Alienor Didier, Juan les pins (FR); Serena Rocconi, Golfe Juan (FR); Camille Garello, Antibes (FR); Florian Briy, Antibes (FR); Lionel Perez, Juan les Pins (FR)

(73) Assignee: AMADEUS S.A S., Biot (FR)

( * ) Notice: Subject to any disclaimer, the term of this patent is extended or adjusted under 35 U.S.C. 154(b) by 928 days.

(21) Appl. No.: 16/530,352

(22) Filed: Aug. 2, 2019

(65) Prior Publication Data
US 2020/0051192 A1    Feb. 13, 2020

(30) Foreign Application Priority Data

Aug. 9, 2018 (FR) .................. FR1857412

(51) Int. Cl.
*G06F 16/29* (2019.01)
*G01C 21/34* (2006.01)
(Continued)

(52) U.S. Cl.
CPC .......... *G06Q 50/26* (2013.01); *G01C 21/343* (2013.01); *G06F 16/29* (2019.01);
(Continued)

(58) Field of Classification Search
CPC .............. G06Q 50/26; G06Q 10/047; G06Q 10/06316; G06Q 50/30; G06F 16/9537; G06F 16/29; G01C 21/343
(Continued)

(56) References Cited

U.S. PATENT DOCUMENTS

| 8,700,328 B1 | 4/2014 | Raychev et al. |
| 8,738,286 B2 | 5/2014 | Bast et al. |

(Continued)

FOREIGN PATENT DOCUMENTS

| DE | 102014102035 A1 | 2/2015 |
| EP | 2897344 A1 | 7/2015 |
| WO | WO-2016153426 A1 | 9/2016 |

OTHER PUBLICATIONS

Optimization for dynamic ride-sharing: A review (Year: 2012).*
(Continued)

*Primary Examiner* — Zeina Elchanti
(74) *Attorney, Agent, or Firm* — Perry + Currier

(57) ABSTRACT

A method of handling a client's request for origin/destination and/or departure/arrival time is provided. Data is gathered from content-provider platforms and transport-service graphs, corresponding to public-transportation networks, are generated with their nodes representing stops in a corresponding public-transportation network and their internal edges representing connections. A connection graph including the transport-service graphs is generated. Origin/destination nodes are selected in the connection graph as well as routes between these nodes. Therein, successive segments for a route, corresponding to transportation connections between nodes of a transport-service graph are joined. Queries asking price, availability, departure/arrival time based on departure/arrival time of the request and estimated travel duration of a selected route's segment are sent to content-provider platforms. Responses to the queries are aggregated to build a set of itineraries and sending an offer comprising this set to the client.

19 Claims, 14 Drawing Sheets

(51) Int. Cl.
 *G06Q 10/06* (2012.01)
 *G06Q 50/30* (2012.01)
 *G06Q 10/04* (2012.01)
 *G06Q 50/26* (2012.01)
 *G06F 16/9537* (2019.01)
 *G06Q 10/0631* (2023.01)
 *G06Q 10/047* (2023.01)

(52) U.S. Cl.
 CPC ....... *G06F 16/9537* (2019.01); *G06Q 10/047* (2013.01); *G06Q 10/06316* (2013.01); *G06Q 50/30* (2013.01)

(58) Field of Classification Search
 USPC .......................................................... 705/6
 See application file for complete search history.

(56) References Cited

U.S. PATENT DOCUMENTS

| | | |
|---|---|---|
| 8,972,185 B1 | 3/2015 | Viger et al. |
| 8,972,190 B1 | 3/2015 | Pech et al. |
| 8,977,495 B1* | 3/2015 | Hurand .............. G01C 21/3423 |
| | | 701/527 |
| 9,261,374 B2* | 2/2016 | Mundinger .......... G06Q 10/047 |
| 10,295,353 B2* | 5/2019 | König .............. G08G 1/096833 |
| 2015/0323331 A1* | 11/2015 | Lord ................... G01C 21/3438 |
| | | 701/410 |
| 2016/0260183 A1* | 9/2016 | Kim ................... G06Q 30/0627 |
| 2017/0059341 A1 | 3/2017 | Vo et al. |
| 2019/0086221 A1* | 3/2019 | Thiyagarajan ..... G01C 21/3438 |
| 2019/0186938 A1* | 6/2019 | Pasukonis .......... G01C 21/3423 |
| 2019/0383621 A1* | 12/2019 | Isaacs ................ G06Q 30/0282 |
| 2019/0383622 A1* | 12/2019 | Aich .................. G01C 21/3423 |
| 2019/0383623 A1* | 12/2019 | Aich ................... G06Q 10/047 |

OTHER PUBLICATIONS

INPI, Search Report and Written Opinion with English translation, dated Apr. 12, 2019, re: French Patent Application No. 1857412.

\* cited by examiner

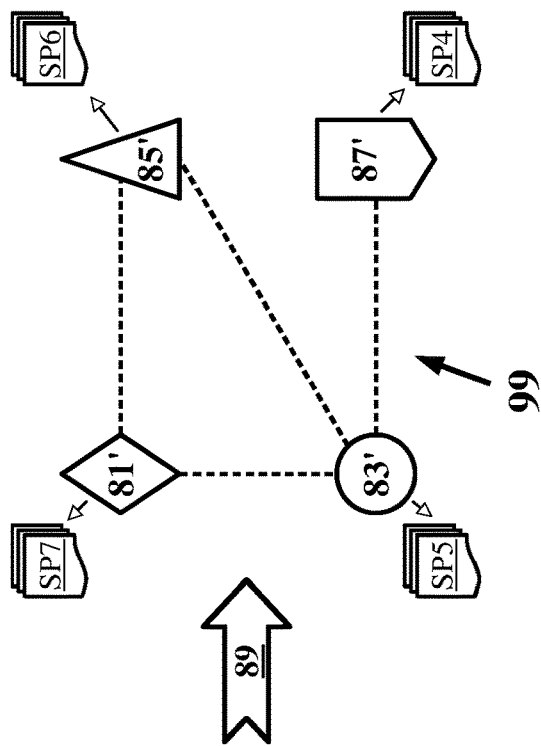
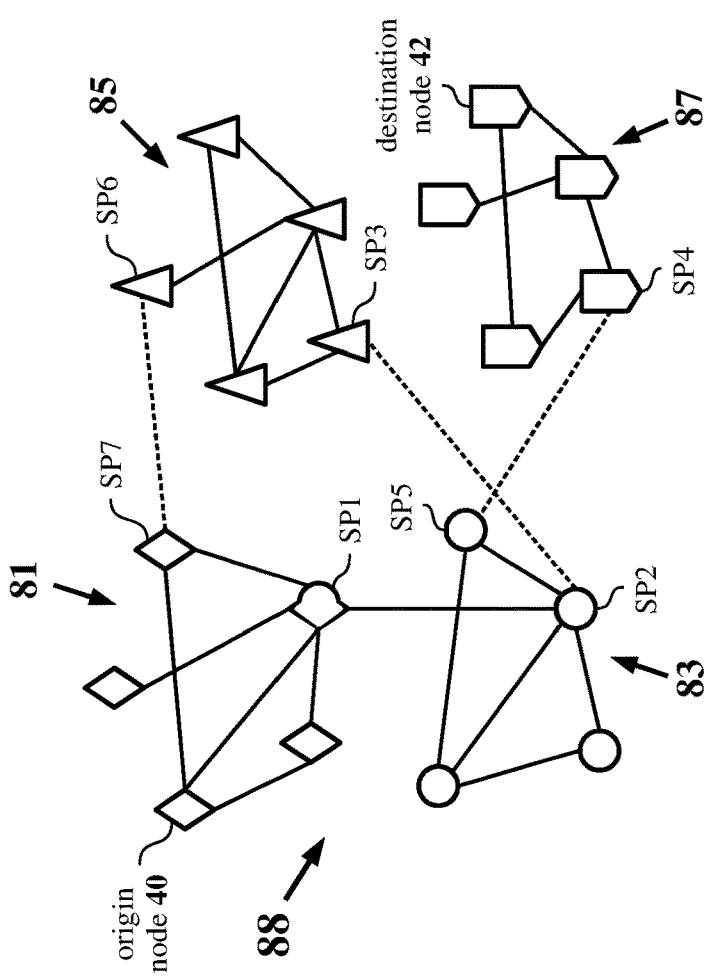
Fig. 3a

```xml
<?xml version="1.0" encoding="UTF-8" standalone="yes"?>
<networkDataRS xmlns="http://it2rail.org/ifw/infrastructure/data/NetworkData" xmlns:ns2="http://it2rail.org/ifw/It2RailCommon"
xmlns:ns3="http://it2rail.org/ifw/infrastructure/Network">
    <StopPlace xmlns:xsi="http://www.w3.org/2001/XMLSchema-instance" xsi:type="ns2:Airport">
        <ns2:StopPlaceID>BCN</ns2:StopPlaceID>
        <ns2:hasGlobalID>http://it2rail.org/infrastructure/iata/BCN</ns2:hasGlobalID>
        <ns2:hasName>Aeroport de Barcelona-El Prat</ns2:hasName>
        <ns2:hasStopPlaceCode>
            <ns2:hasCodeValue>BCN</ns2:hasCodeValue>
            <ns2:hasCodeType>IATA</ns2:hasCodeType>
        </ns2:hasStopPlaceCode>
        <ns2:isAtLocation>
            <ns2:hasGeoCoordinates>
                <ns2:latitude>41.297445</ns2:latitude>
                <ns2:longitude>2.0811054</ns2:longitude>
            </ns2:hasGeoCoordinates>
            <ns2:hasAddress>
                <ns2:city>Barcelona</ns2:city>
            </ns2:hasAddress>
        </ns2:isAtLocation>
    </StopPlace>
    <StopPlace xmlns:xsi="http://www.w3.org/2001/XMLSchema-instance" xsi:type="ns2:Airport">
        <ns2:StopPlaceID>AMS</ns2:StopPlaceID>
        <ns2:hasGlobalID>http://it2rail.org/infrastructure/iata/AMS</ns2:hasGlobalID>
        <ns2:hasName>Amsterdam Airport Schiphol</ns2:hasName>
        <ns2:hasStopPlaceCode>
            <ns2:hasCodeValue>AMS</ns2:hasCodeValue>
            <ns2:hasCodeType>IATA</ns2:hasCodeType>
        </ns2:hasStopPlaceCode>
        <ns2:isAtLocation>
            <ns2:hasGeoCoordinates>
                <ns2:latitude>52.3105386</ns2:latitude>
                <ns2:longitude>4.7660857</ns2:longitude>
            </ns2:hasGeoCoordinates>
            <ns2:hasAddress>
                <ns2:city>Amsterdam</ns2:city>
            </ns2:hasAddress>
        </ns2:isAtLocation>
    </StopPlace>
```

Fig. 4a

```xml
</RouteLink>
  <RouteLink>
    <ns3:startsAt>BCN</ns3:startsAt>
    <ns3:endsAt>AMS</ns3:endsAt>
    <ns3:networkStatistics statisticsPeriodStart="2017-01-01+01:00" statisticsPeriodEnd="2019-12-31+01:00">
      <ns3:dailyServiceStartTime>06:00:00.000+01:00</ns3:dailyServiceStartTime>
      <ns3:dailyServiceStopTime>22:00:00.000+01:00</ns3:dailyServiceStopTime>
      <ns3:serviceFrequency>1111111</ns3:serviceFrequency>
      <ns3:minETT>145.0</ns3:minETT>
      <ns3:avgETT>145.0</ns3:avgETT>
      <ns3:serviceDensity>8.0</ns3:serviceDensity>
      <ns3:travelExpertID>http://it2rail.org/id/travelexpert/Amadeus</ns3:travelExpertID>
    </ns3:networkStatistics>
  </RouteLink>
  <RouteLink>
    <ns3:startsAt>AMS</ns3:startsAt>
    <ns3:endsAt>BCN</ns3:endsAt>
    <ns3:networkStatistics statisticsPeriodStart="2017-01-01+01:00" statisticsPeriodEnd="2019-12-31+01:00">
      <ns3:dailyServiceStartTime>06:00:00.000+01:00</ns3:dailyServiceStartTime>
      <ns3:dailyServiceStopTime>22:00:00.000+01:00</ns3:dailyServiceStopTime>
      <ns3:serviceFrequency>1111111</ns3:serviceFrequency>
      <ns3:minETT>145.0</ns3:minETT>
      <ns3:avgETT>145.0</ns3:avgETT>
      <ns3:serviceDensity>8.0</ns3:serviceDensity>
      <ns3:travelExpertID>http://it2rail.org/id/travelexpert/Amadeus</ns3:travelExpertID>
    </ns3:networkStatistics>
  </RouteLink>
</networkDataRS>
```

Fig. 4b

METHOD OF GENERATING A SET OF ITINERARIES BY LIMITED QUERYING OF DATABASES

STATEMENT REGARDING GOVERNMENT FUNDING

The project leading to this application has received funding from the European Union's Horizon 2020 research and innovation programme under grant agreement No 636078.

CROSS REFERENCE TO RELATED APPLICATION

This application claims priority from French patent application no. 1857412, filed Aug. 9, 2018, the contents of which is incorporated herein by reference.

FIELD

The present invention generally relates to information technology and information exchange. More specifically, it is directed to a mechanism to provide requesting clients with information from a plurality of content provider platforms using data exchange standards.

BACKGROUND

EP 2 897 344 B1 pertains to computer system for interconnecting content requesting clients with a plurality of content provider platforms offering content by using content-provider-specific communication protocols. It has a runtime module arranged to map content-provider-specific data formats and content-provider-specific message flows to data formats and message flows utilized by the client interface. Furthermore, it includes a plurality of content-provider-related plug-ins. Each content-provider-related plug-in defines rules for a mapping between the content-provider-specific data formats and content-provider-specific message flows of at least one of the plurality of content provider platforms and the data formats and message flows utilized by the client interface.

SUMMARY

According to a first aspect, a method of handling requests of a content-requesting client by querying a plurality of content provider platforms is provided. A request comprises an origin, a destination, and at least one of a departure time and an arrival time. The method comprises a graph generating process performed by a route module before a request from the content-requesting client is received. The method further comprises a route selecting process performed by the route module after the request from the content-requesting client is received and an offer building process performed by an offer module after the performance of the route selecting process. The graph generating process comprises gathering data from the plurality of content provider platforms and generating a plurality of transport-service graphs. Each transport-service graph comprises a plurality of nodes and internal edges connecting the nodes. The nodes represent stops in a corresponding public-transportation network and the internal edges represent connections between the stops. The method further comprises generating a connection graph comprising the plurality of transport-service graphs. The route selecting process comprises selecting an origin node and a destination node in the connection graph according to the origin and destination, respectively. The route selecting process further comprises selecting one or more routes between the origin node and the destination node comprising joining for a route a number of successive segments. A segment is a transportation connection between two nodes of a single transport-service graph by one or more internal edges. The offer building process comprises sending at least one query asking a price and availability of a segment of the routes selected by the route selecting process to a respective content provider platform. The query comprises at least one of departure time and arrival time of the segment based on at least one of the departure time and the arrival time of the request and on an estimated travel duration of preceding and subsequent segments, respectively. The offer building process further comprises aggregating responses from the queried content provider platforms in order to build an itinerary for each route selected, thereby building a set of itineraries and sending an offer comprising the set of itineraries to the content-requesting client.

According to a second aspect, a distributed computer system for handling requests of a content-requesting client by querying a plurality of content provider platforms is provided. Each content provider platform is associated with at least one public-transportation network and offering transport content. The distributed computer system is arranged to gather data associated with the plurality of content provider platforms. The distributed computer system is further arranged to generate a number of graphs representing correlations of the gathered data and is arranged to store at least one graph on at least one storage device. The distributed computer system comprises a client interface arranged to exchange itinerary-oriented messages with the content-requesting client. The distributed computer system further comprises a route module that is arranged to gather the data associated with the plurality of content provider platforms and arranged to generate at least one transport-service graph and a connection graph representing the correlations of the gathered data before a request from the content-requesting client is received, wherein the at least one transport-service graph comprises internal edges. The route module is further arranged to select one or more routes from the connection graph after the request from the content-requesting client is received, comprising joining for a route a number of successive segments. A segment is a transportation connection between two nodes of a single transport-service graph by one or more internal edges. The distributed computer system further comprises an offer module arranged to obtain the selected routes and query at least one content provider platform for a price and availability of at least one segment of the routes selected. The offer module is further arranged to aggregate responses from the at least one queried content provider platform to build an itinerary for each route selected, thereby building a set of itineraries. The distributed computer system is further arranged to send the set of itineraries to the content-requesting client via the client interface in form of an offer.

According to a third aspect, a computer program product comprising program code instructions stored on a computer readable medium to execute the method steps according to the first aspect when said program is executed on a computer is provided.

General Description, also f Supplementary Examples

A content requesting client, e.g. an end-consumer using an application on a handheld device, such as for example a smartphone, a laptop, or the like, requests a set of itineraries to be displayed on his/her end. The client sets a task to be solved by the present method. For this task the client, e.g. a user, determines an origin, which might be the user's current location, and a destination, which might be an intermediate stop on a journey or an end stop, for example, a hotel in which the user wants to spend his holiday. In this way, a request comprises an origin and a destination. The request of the client further comprises at least one of a departure time and an arrival time.

A request by the content-requesting client is handled by querying a plurality of content provider platforms, each may be associated with at least one public-transportation network. An individual public-transportation network is operated by a transport operator, as for example SNCF, Air France, DB, MVV (the Munich public-transport system), Trenitalia, or the like. The transport-service graphs are generated by gathering route data associated with content provider platforms and storing the data in one or more graph databases.

The method comprises a graph generating process performed by a route module before a request from the content-requesting client is received, a route selecting process performed by the route module after the request from the content-requesting client is received, and an offer building process performed by an offer module after the performance of the route selecting process.

The set of itineraries, which is then calculated and transmitted to the client for displaying, might be ranked according to one or more parameters, i.e. not all itineraries starting at the selected origin and ending at the selected destination are calculated and subsequently transmitted to the client.

Only a selection of itineraries is sent to the content requesting client. In fact, only a limited selection of itineraries from the plurality of possible itineraries is even calculated. The itineraries contain route information, e.g. possible routes or paths on which one could get from A to B, time information, e.g. when you could get from A to B, as well as pricing information, e.g. how much would it cost to get from A to B, which might vary depending on the time of travel.

The graph generating process, performed before a request from the content requesting client is received, comprises gathering data from the plurality of content provider platforms. The content provider platforms may be provided by the transport operators or may alternatively be provided by a third-party entity that manages the route data of one or more transport operators.

The method comprises generating a plurality of transport-service graphs. Each of these transport-service graphs corresponds to a public-transportation network operated by a transport operator with a given mode of transportation, for example "air", "rail" or "coach". To provide an example. two airlines operating from the same airport are transport operators of the same transportation mode.

The transport-service graphs are generated by gathering route data associated with content provider platforms and storing the data in one or more graph databases. A graph database is a database that uses graph structures for semantic queries with nodes, edges and properties to represent and store data. A concept of such a system is that the graph (or edge or relationship) directly relates data items. The relationships allow data in the database to be linked together directly, and in many cases allow data to be retrieved with one operation.

Each transport-service graph comprises a plurality of nodes and internal edges connecting the nodes, wherein the nodes represent stops in a corresponding public-transportation network and the internal edges represent connections with the given mode of transportation between the stops. The stops therefore correspond, for example, to different train stations of a rail network served by a particular transport operator, such as DB or SNCF.

Each node of a transport-service graph may be reachable by at least one of the other nodes through one or more internal edges. This means that the transport-service graphs are, in a mathematical sense, closed graphs.

The method comprises generating a connection graph comprising the plurality of transport-service graphs. The connection graph is thereby composed of a plurality of transport-service graphs each representing an individual public-transportation network operated by a transport operator.

The route selecting process comprises selecting an origin node and a destination node in the connection graph. The origin node represents a stop that is associated with a travel origin. The travel origin as requested by a client is usually not the same as the stop associated with the travel origin. The travel origin might, for example, be located at a particular street address or point of interest, e.g. "Sagrada Familia", whereas the stop associated with the travel origin might be a metro station near this address or point of interest, in this example, the "Sagrada Familia Metro station". The same applies for the travel destination and the stop associated with the travel destination.

The stops associated with the travel origin and destination are represented by the nodes of the transport-service graphs and therefore by the nodes of the connection graph.

Selecting one or more routes between the origin node and the destination node comprising joining for a route a number of successive segments. A segment is a transportation connection between two nodes of a single transport-service graph by one or more internal edges. More specifically, a segment is a transportation connection between two nodes of a single transport-service graph by one or more internal edges of said single transport service graph. To provide an example, a segment of a route from the origin node "Sagrada Familia Metro station" to the destination node "Brandenburger Tor Metro station" is an internal edge from node "Barcelona Airport" to node "Paris Airport" which is associated with the transportation mode "flight".

In some embodiments, several individual public transportation networks with different but similar modes of transportation are operated by the same transport operator, e.g. the MVV operates subways, busses, trams. Hence, a transport-service segment operated by a transport operator may comprise several segments with congeneric modes of transportation.

The offer building process comprises sending at least one query asking for at least one of time data, pricing data, and availability data of a segment of the routes selected by the route selecting process to a respective content provider platform.

Pricing data and availability data for the selected routes is gathered from the content providing platforms, e.g. from dedicated pricing databases. The query is, for example, a database query, such as an SQL query or the like.

The query for time data comprises at least one of departure time and arrival time of the segment based on at least one of the departure time and the arrival time of the request and on an estimated travel duration of preceding and subsequent segments, respectively.

Also, the departure and arrival time is, for example, queried from the content provider platforms, e.g. directly from the homepages or dedicated databases of the associated transport services. In some examples, detailed time data may be queried for two to five routes, which are the only remaining routes after the route selection process. In some other examples, more routes may be remaining and pricing/availability information as well as departure and arrival time is then queried for all of those routes.

As time data has only to be queried for selected routes, other routes being discarded, the number of queries to the respective content provider platform is reduced.

The departure time of the first segment of a route is gathered in compliance with a departure time associated with the request from the content requesting client from at least one of the plurality of content provider platforms. This means that for the route segment starting at the origin node, the departure time queried for this segment should lie close to the departure time for the entire journey requested by the content requesting client.

In general, the departure time and arrival time of the segments are based on the departure time and the arrival time of the request and on an estimated travel duration of preceding and subsequent segments, respectively.

Since the estimated travel duration for each preceding and subsequent segment are known, an estimated departure time/arrival time can be obtained for each segment. In this way, the departure time for, e.g. the second segment of a route, can be obtained by adding the estimated travel duration of the first segment to the departure time of the first segment, queried from the content provider platform associated with the first segment.

Therefore, queries for departure and/or arrival times associated with a specific segment have only to be made for times close to the arrival/departure times of the segment calculated based on the departure/arrival time of the request and the estimated travel durations of preceding and subsequent segments.

Corresponding to the departure time queried for the segment starting at the origin node, the arrival time queried for the segment ending at the destination node, should lie close to the arrival time for the entire journey requested.

In some examples, the estimated travel duration of segments is determined by the route module, hence, the (software) module that performs the graph generating process.

The number of queries to the content provider platforms is further reduced as price/availability are only queried for the arrival times/departure times calculated based on the departure/arrival time of the request and said estimated travel durations for subsequent and precedent segments.

The pricing data may be queried in parallel to the time data or alternatively a query for the pricing data may be performed in a subsequent activity. A parallel data querying procedure could finish the task faster, however, the pricing data may vary depending on the exact time at which a segment is to be traversed. A railway ticket during rush hours, i.e. during a time when many people, e.g. commuters trying to get to their workplace, are using the transport service, may be a lot more expensive than a railway ticket on the same route a few hours later when there is only reduced traffic on this particular segment of the route.

In some examples, a plurality of queries associated with one or more segments directed to a single content provider platform are grouped to a single query to the respective content provider platform.

The offer building process comprises further aggregating responses from the queried content provider platforms in order to build an itinerary for each route selected. Thereby, a set of itineraries is built.

By aggregating responses, the relevant departure time/arrival time and the corresponding price is gathered for each segment. This gathered data is used to generate the final itineraries. This is done by joining the gathered data for each subsequent segment of the selected routes.

In other words, a selected route with segments to which a prize and respective departure and arrival times are associated forms an itinerary. A set with an itinerary for each route that was selected in the route selection process forms a set of itineraries.

An offer comprising the set of itineraries is sent to the content-requesting client—as an answer to the request from the content-requesting client. This is, for example, done via a client interface.

In some examples, generating the connection graph comprises connecting a first node of a first transport-service graph and a second node of a second transport-service graph by a connecting edge in the connection graph, in response to the first node and the second node representing stops located within walking distance to each other and being of different modes of transportation, as for example bus and rail.

Hence, the transport-service graphs are interconnected within the connection graph by a connecting edge which represents an option to change from a first transportation network, operated by the first transport operator to a second transportation network operated by the second transport operator. The respective transportation networks are represented by the respective transport-service graphs comprised by the connection graph. The option to change the connecting edge represents is walking the distance between the two stops represented by the respective nodes of the transport-service graphs. Transport operators may have knowledge about what stops are connectable by an acceptable walking distance based on traveler experience data.

To provide an example, a node in a transport-service graph representing a tram station, being a stop in an urban transport provider network may be connected to a node representing a train station, being a stop in a rail provider transportation network, by a connecting edge in the connection graph, if the tram station and the train station are located in a walking distance to each other.

A walking distance between two stops is, for example, assumed if the two stops are separated from each other by less than 1000 meters. In some examples, the actual distance covered by a connecting edge may exceed an average walking distance of roughly one or two kilometers and involve a dedicated train, bus, or the like, which helps travelers to reach their connections within an appropriate time frame.

In some examples, generating the connection graph comprises merging a third node of a third transport-service graph and a fourth node of a fourth transport operator, in response to the third node of the third transport-service graph and the fourth node of a fourth transport operator being of the same mode of transportation, having the same geographical position.

In some embodiments, the third node of the third transport-service graph may be the same node as the first node of the first transport-service graph. Put differently, a node of a transport-service graph may be merged with another node of a different transport-service graph and at the same time this node being connected with a connecting edge to a yet another node of yet another transport-service graph.

To provide an example, a transport-service graph for DB and a transport-service graph of SNCF are nodes of transport-service graphs of the same mode of transportation. So, in, e.g. Strasbourg, where the central train station is served by DB as well as by SNCF, the node representing the Strasbourg central station in the transport-service graph for DB and the respective node representing the station in the transport-service graph for SNCF are merged in the connection graph that comprises the two transport-service graphs.

In some examples, selecting the one or more routes comprises ranking of the one or more routes according to at least one routing parameter, wherein the at least one routing parameter comprises the estimated travel duration for at least one segment of a selected route.

When a client sends a request, routes are ranked according to one or more routing parameters. In some examples the at least one routing parameter comprises the estimated travel duration, as it is an aim in any case to provide a selection of routes, with routes ranked according to their estimated travel duration. The overall estimated travel duration for a route is calculated, for example as a sum of all estimated travel durations for segments of the route and the all the interchange durations between two subsequent segments of the route.

In some examples, the at least one routing parameter comprises a frequency of transportation options for at least one segment of a selected route. The frequency of transportation options indicates how often at least a part of a route is served by a given public transport operator (e.g. one time per hour, three times a day etc.).

In some examples, the at least one routing parameter comprises a minimum interchange duration in-between two subsequent segments, a travel distance of a route, number of transport operators, or the like.

In some examples, a minimum time for changing between segments, transport services, or the like may additionally be individually adjustable by a user-preference parameter. A senior citizen, for example, may want to increase the minimum time between subsequent segments as they are often slower moving than the average traveler for whom the change-time calculation is usually performed, or a passenger, for example, arriving at an airport may need some additional time for other actions like check-in procedures, or the like.

The arrival/departure times associated with the route segments are, for example, chosen like that a given interchange duration in-between the departure time of a second (subsequent) segment and the arrival time of the first (precedent) segment is retained. In this way, it can be assured that there is, for example, at least 10 minutes interchange duration between two subsequent segments.

The two stops located closest to the origin and destination given in the client's request, respectively, are selected in the connection graph, i.e. an origin node and a destination node are determined within the connection graph based on the relative location of the given origin and destination with regard to available stops of all available transport operators.

Subsequently, different routes starting from the origin node and ending at the destination node are retrieved from the connection graph. Therefor the edges of the connection graph a traversed from the origin node to the destination node. The thus obtained routes may then be optimized according to the one or more routing parameters.

The routes may be ranked based on the given routing parameters using the Martins' algorithm. Typically, for example, only for a fraction of the ranked routes (e.g. the ten top ranked routes) additional data to form an itinerary such as departure time/arrival time of the segments of the routes and respective and pricing data is only queried for those top ranked routes.

In some examples, selecting the one or more routes comprises selecting routes with at least one of minimal estimated travel duration and maximal frequency of transportation options.

In some examples, the selection process comprises selecting routes with minimal estimated travel duration and selecting routes with maximal frequency of transportation options. The ranking aims, for example, at finding routes with an overall (seen from origin node to destination node) maximum frequency of transportation options and minimum estimated travel time. The result of this ranking is not a single optimal route with the minimum estimated travel time and, for example, the maximum frequency of transportation options, but is a set of routes that comprises a given number of routes with associated estimated travels time and a frequency of transportation options that are ranked higher with respect to these criteria than other routes.

In some examples, the graph generating process further comprises generating a metagraph comprising a plurality of metagraph nodes and metagraph edges, wherein each metagraph node represents a transport-service graph and the metagraph edges represent options of changing from a first public-transportation network associated with a first transport-service graph to a second public-transportation network associated with a second transport-service graph.

The metagraph is, for example, generated on the basis of the connection graph by mapping each transport-service graph to a node and mapping each edge connecting a first transport-service graph to a second transport-service graph, i.e. edges that connect a node of a first transport-service graph to a node of a second transport-service graph, to an edge of the metagraph.

The metagraph and the connection graph are, for example, both stored on storage devices of the distributed computer system on which the method is performed. They can be stored on the same storage devices or on different storage devices.

In the case that a node is comprised by a first transport-service graph and a second transport-service graph (hence a merged node as described above), which is the case if both transport-service graphs are associated with the same mode of transportation and both nodes represent stops at the same geographical position, this common node of the transport-service graphs is, for example, comprised once by the node of the metagraph representing the first transport-service graph and comprised once by the node of the metagraph representing the second transport-service graph.

In the case that the nodes of the first and second transport-service graph represent stops located within walking distance to each other, they are connected by a connecting edge in the connection graph as described above. Such a connection is mapped to the metagraph, for example, by mapping each connecting edge to a corresponding edge of the metagraph.

The edges of the metagraph thereby represent, for example, options of changing between a first transport operator and a second transport operator. This is, for example, a change from "Air France" to "Lufthansa" or a change from "Lufthansa" to "SNCF". The option of changing between the "Lufthansa" and the "SNCF" transport-service graphs is, for example, represented by a connecting edge mapped to the metagraph if the stop in the "Lufthansa" network and the stop in the "SNCF" network are located in a walking distance to each other.

In some examples, the metagraph comprises data related to at least one of nodes and edges of the connection graph.

The selection of the first and second nodes comprises, for example, identifying which nodes of the metagraph are associated with the origin node of the connection graph and the destination node of the connection graph, respectively. To provide for this identification, for example, each node of the metagraph carries data about which node of the connection graph is comprised by which metagraph node. This is achieved, for example, by providing a list with stops (corresponding to nodes of the connection graph) associated with a metagraph node for each metagraph node.

The metagraph comprises, for example, also data about the edges of the connection graph, such as about the number of edges (corresponding to interconnections) in a transport-service graph represented by a metagraph node.

In some examples, selecting the one or more routes comprises applying a path-optimization algorithm to at least one of the connection graph and the metagraph.

The edges of at least one of the connection graph and the metagraph, are weighted according to at least one of the routing parameters for applying the path-optimization algorithm.

For example, when the path-optimization algorithm is applied to the connection graph, each segment represented by an edge of a comprised transport-service graph is weighted according to the estimated travel duration for this segment and can be weighted in addition also according to other routing parameters, as for example, the above-mentioned frequency of transportation options.

Similarly, the edges of the metagraph could be weighted according to the at least one routing parameters.

In some examples, selecting the one or more routes thereby comprises forming one or more metaroutes by tracing paths along successive metagraph nodes from the metagraph node comprising the origin node to the metagraph node comprising the destination node. The tracing of paths along successive metagraph nodes may be performed by applying a path-optimization algorithm on the (weighted) metagraph.

The metaroute found thereby determines a set of transport-service graphs providing at least one segment of the route between the origin node and the destination node. As mentioned above, those transport-service graphs are a comprised by the connection graph.

The path-optimization algorithm applied to at least one of the (weighted) connection graph and the (weighted) metagraph may be Martin's variant of Dijkstra's algorithm.

By determining the set of transport-service graphs and applying a path-optimization algorithm thereto, the number of routes that are fed to the path-optimization algorithm is reduced (otherwise all the routes would have to be processed by this algorithm). Thus, the processing power required for the route selection is fundamentally reduced.

In some examples, selecting the one or more routes comprises determining at least one of an entry node and an output node of a transport-service graph represented by a metagraph node, which is encompassed by the metaroute.

The entry node of a transport-service graph is, for example, the origin node of a route, but could as well be an output node of another transport-service graph, when the nodes of two transport-service graphs are merged at nodes that correspond to stops in transport-service graphs that have the same mode of transportation and have the same geographical position. An entry node of a transport-service graph could as well be a node of transport-service graph connected to a node of another transport-service graph by a connecting edge, if the stops represented by the nodes are located in walking distance to each other and have different modes of transportation, e.g. air and urban transport.

An output node represents a stop allowing change to a stop corresponding to an entry node of a successive transport-service graph.

In some examples, selecting the one or more routes comprises tracing paths along the internal edges from the entry node to the output node of a transport-service graph.

Once the output node and entry nodes of transport-service graphs represented by metagraph nodes encompassed by the metaroute are obtained, an (optimal) connection between those entry nodes and output nodes is searched. This is, for example, achieved by weighting the internal edges of the respective transport-service graphs according to the at least one routing parameter and applying a path-optimization algorithm on the transport-service graph. This way, for example, a path with minimal estimated travel duration and maximum frequency of transportation options between said entry nodes and output nodes is found.

A route between an origin node and destination node comprises a plurality of paths between entry nodes and output nodes of successive transport-service graphs represented by successive metagraph nodes of the obtained metaroute.

In some examples, selecting the one or more routes is based on a user-preference parameter.

In some examples the routes are selected (also) based on a user-preference parameter, in particular, a user-preference parameter regarding usage and/or prohibition of specific transport-services available for the routes. Such user-preference parameters could be for example: "rail only", "without flight", "without coach" or the like.

In some examples, routes that are not in compliance with the at least one user-preference parameter are dismissed.

When selecting one or more routes between the origin node and destination node, routes that are not in compliance with the at least one user-preference parameter may be dismissed. To achieve this, either (i) selecting routes that do not comply with the at least one user-preference parameter could be prevented beforehand (they are not considered in the selection) or (ii) a selection of routes is performed and those routes that do not comply with user-preference parameters could be discarded so that they are finally not included when building itineraries on the basis of the selected routes.

In some examples, the offer building process further comprises discarding a selected route in response to a segment of that route being unavailable. A route could be set as "unavailable" by the content provider platform if, for example, maintenance work is performed on a section of a rail network or urban transport network or if, for example, a flight is already sold out. As the route is discarded, no itinerary is formed for this route and therefore no offer pertaining to this route is built.

The computational resources required for the above described handling of requests of content-requesting clients are reduced, in particular, (i) the processing power for selecting the one or more routes and (ii) the data transfer rates for building the itineraries, compared to methods according to the state of the art. As described above, the number of nodes in the connection graph to be processed by the path-optimization algorithm for route selection is reduced by such a pre-selection of the set of transport-service graphs, which constitute a subgraph of the connection graph. Moreover, by discarding some of the potential routes, for example routes with high travel duration and/or many changeovers, the number of routes based on which the databases are queried is reduced. The number of queries to the content provider platforms is further reduced as price/availability are only queried for the arrival times/departure times calculated based on the departure/arrival time of the request and said estimated travel durations for subsequent and precedent segments.

A distributed computer system with one or more processors and non-volatile memories may be used as basis to run the above described activities.

When executable program code is executed by a processor of the distributed computer system, the processor causes the system to perform the above described activities leading from a request by a content requesting client to the generated response in form of a set of itineraries.

In some examples, the distributed computer system comprises a provider interface arranged to exchange itinerary-oriented messages with the plurality of content provider platforms.

The departure time/arrival time information, availability information and pricing data may be queried and aggregated from the content providing platforms via the one or more provider interface(s), which allow requests/responses to be sent by the distributed computer system to the content providing platforms and vice versa.

In some examples, the client interface is further arranged to communicate with a hand-held device operated by a content-requesting client.

The response in form of a set of itineraries is transmitted to the content requesting client via the client interface and subsequently displayed on the clients display, e.g. the set of itineraries is displayed within a "Travel Companion" application on a user's hand-held device, such as a smartphone.

For example, 100 potential routes may be determined by the route selection process. Thereafter, some of these 100 potential routes are discarded according to the threshold (e.g. more than 3 changeovers). This may result in 30 routes forming the reduced set of routes. Subsequently, a set of itineraries is generated based on these 30 routes. These itineraries are then sent to the content requesting client via the client interface. At least some of these 30 itineraries are subsequently displayed on a client's device, e.g. 10 at a time, based on an individually adjustable ranking setting. Such a ranking setting could be shortest route, cheapest fare, shortest travel time, fewest changes between travel services, or the like.

Furthermore, a computer program product is provided. The computer program product comprises program code instructions stored on a computer readable medium to execute the method steps described above when said program is executed on a computer.

BRIEF DESCRIPTION OF THE DRAWINGS

Examples of the invention are now described, also with reference to the accompanying drawings, wherein

FIG. 3a schematically illustrates an exemplary connection graph and an exemplary metagraph;

FIG. 3c illustrates a schematic route from an origin node to a destination node, both nodes comprised by the exemplary connection graph of FIG. 2a;

FIGS. 4a-4b show an excerpt of an exemplary xml-code, showing information being gathered from a content provider platform;

The drawings and the description of the drawings are of examples of the invention and are not of the invention itself. Like reference signs refer to like elements throughout the following description of examples.

DESCRIPTION OF EXAMPLES

Figure 1:
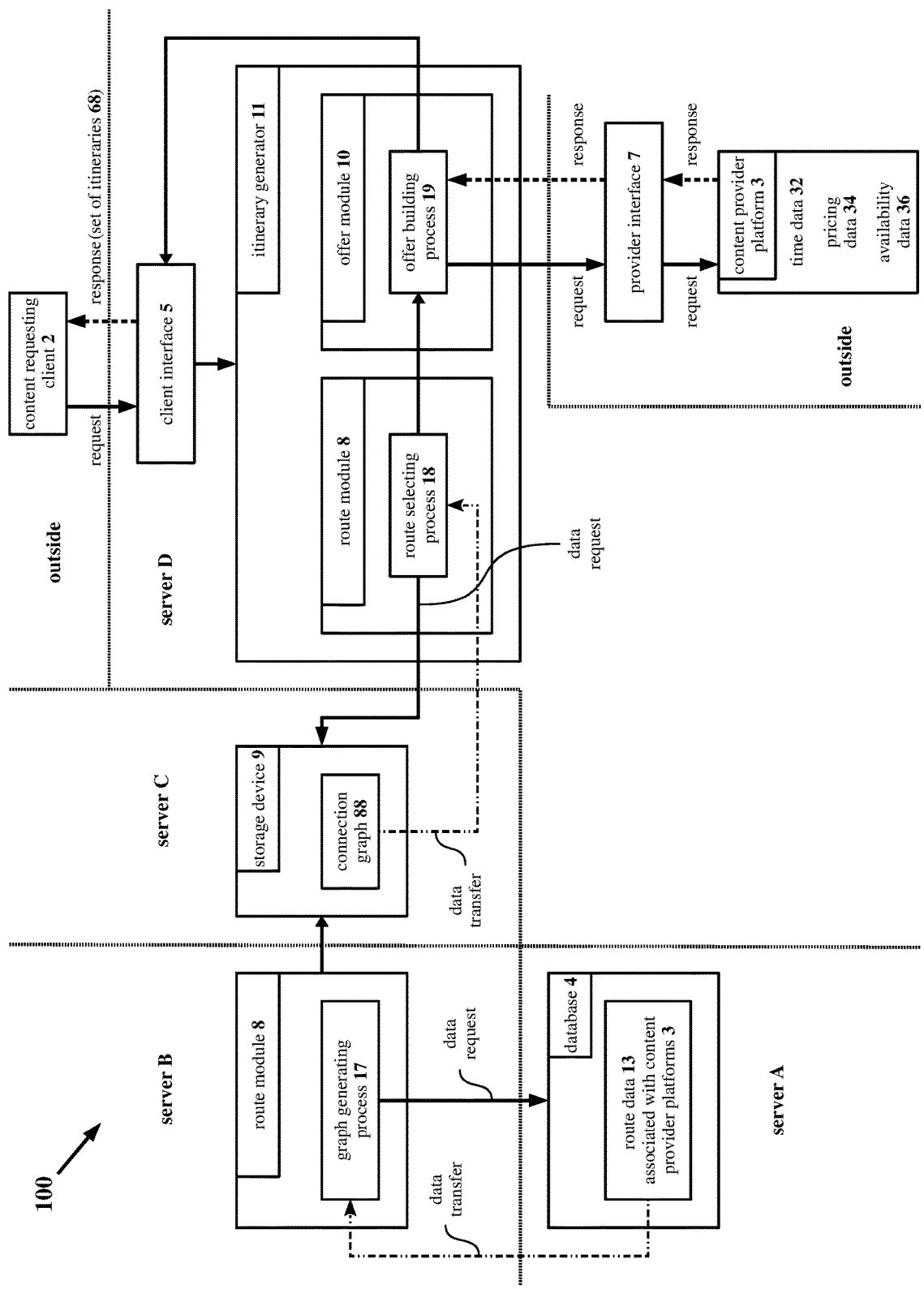
FIG. 1 is a schematic block diagram of a distributed system on which a method of generating a graph, searching routes and building offers in accordance with a request of a client is performed.

A schematic block diagram of a distributed system on which a method of generating a graph, searching routes, and building offers in accordance with a request of a client—is shown in FIG. 1.

In general, the method comprises a graph generating process 17, performed prior to a request from the content requesting client 2. The graph generating process 17 is performed by an instance of a route module 8 on a server B. The graph generating process 17 involves a connection graph builder that builds a connection graph based on route data 13 associated with content provider platforms 3. The connection graph builder is called by the graph generating process 17. The route data 13 is, for example, queried by the graph generating process 17 from a database 4 and is subsequently transferred from the database 4 to the instance of the route module 8, as indicated by the dashed and dotted line from the database 4 to the graph generating process 17. The route data 13 may comprise information about which stops are connected to each other by public-transportation networks operated by a specific transport operator.

The graph generating process 17 builds a connection graph 88 by mapping the stops of public transportation networks operated by a specific transport operator and the connections between these stops to nodes and respective internal edges of those transport-service graphs, thereby generating the transport-service graphs. These transport-service graphs are connected at nodes representing options of changing between the networks represented by the graphs to form the connection graph 88. The connection graph 88 is stored after its generation on a storage device 9.

The graph generating process 17 is a long-term process, which consumes plenty of computation power. This is why the instance of the route module 8 runs on a server B and the connection graph is stored on a server C separate from the server D on which an instance of the offer module 10 runs. The data on the basis of which the instance of the route module 8 performs at least some of its processes, namely the route data 13, is retrieved from a database 4 located on a server A. The servers A, B, C and D together form a distributed system 100.

Upon receiving a request from a content requesting client 2 via the client interface 5, a response including a set of itineraries 68 is created and sent to the content requesting client 2 in a route selecting process 18 and a offer building process 19 performed by an itinerary generator 11. A request from a client could be for example: "from stop A (e.g. "Sagrada Familia", Barcelona) to stop B (e.g. "Brandenburger Tor", Berlin) at Saturday 7 Apr. 2018, at 15:00").

Figure 2:
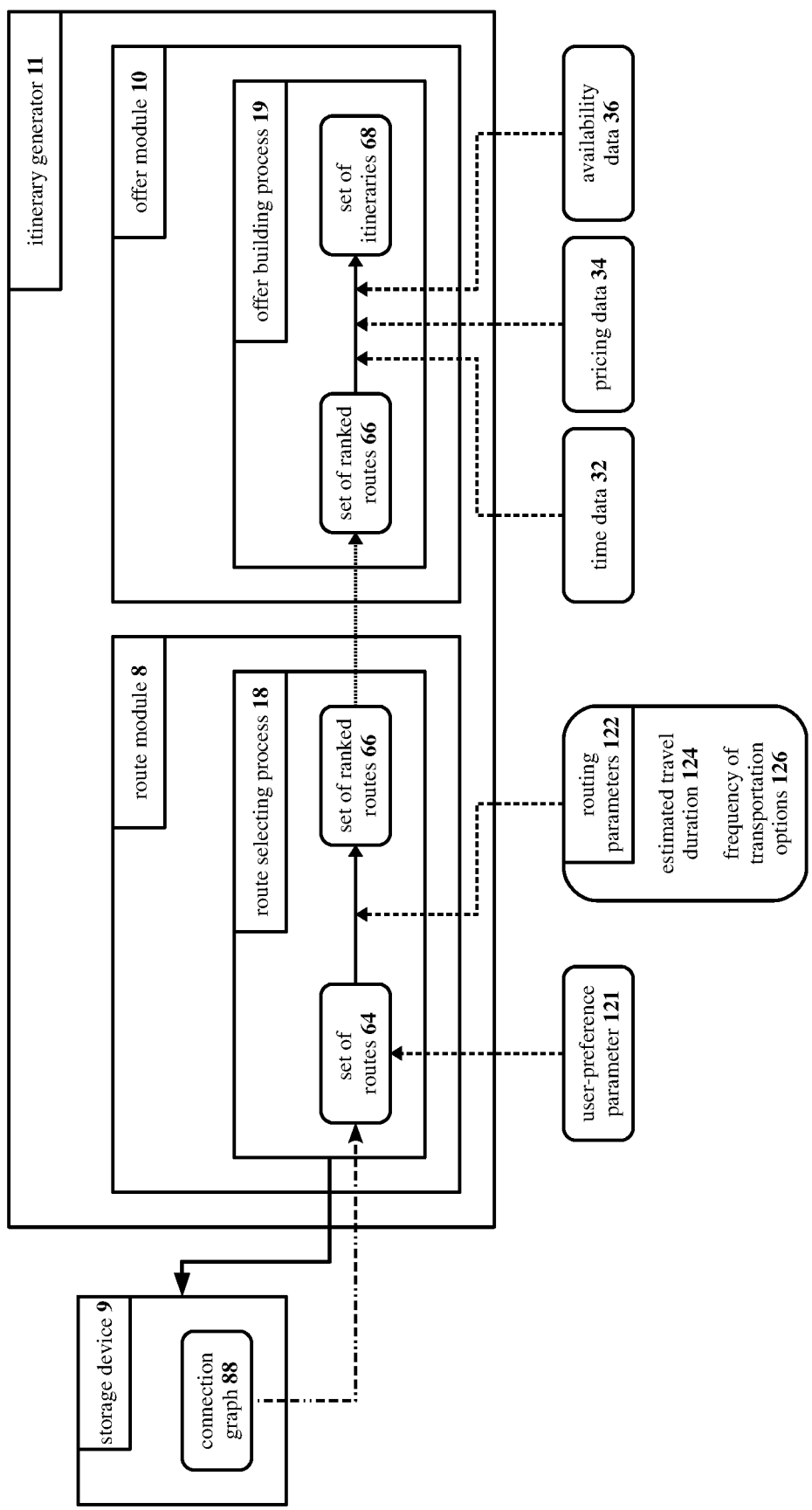
FIG. 2 shows the itinerary generator of FIG. 1 in more detail.

The itinerary generator 11—shown in more detail in FIG. 2—performs these processes. The itinerary generator 11 calls an instance of the route module 8, which runs on server D, and an instance of the offer module 10, which also runs on server D.

A set of routes 64 (shown in FIG. 2) is obtained from the connection graph 88 by the route selecting process 18. The routes are selected in a route selecting process 18 which requests the connection graph data from server C, as indicated by the solid arrow from the route selecting process 18 to the storage device 9.

As a part of the route selecting process 18, the user-preference parameter(s) 121, indicating, for example, which mode of transport not to use, are considered in order to obtain the set of routes 64, which is then ranked according to routing parameters 122. The route selecting process 18 is run by an instance of the route module 8.

The set of routes 64 is obtained from the connection graph based on a metagraph 99 (not shown) which comprises metagraph nodes that represent the transport-service graphs of the connection graph 88. In the metagraph 99 only those nodes representing transport-service graphs are connected for which a change from the represented public-transportation network into the other represented public-transportation service network is possible. By traversing the metagraph 99, a decision is taken which public transportation networks are to be used for the journey from stop A to stop B, e.g. Barcelona urban transport network, Air France air network, and then Berlin urban transport network. Hence, a Subgraph 77 of the connection graph 88 is extracted from the connection graph 88 which includes all the transport-service graphs associated with these public transportations networks.

In some examples, the metagraph is also generated by route module 8 on server B and is also stored on the storage device 9 on server C (this is not shown in FIG. 1 or 2). In some alternative examples, the metagraph may be generated by a further (not shown) server and subsequently be stored on an additional (not shown) storage device.

A ranking of the set of routes is done by performing a path-optimization algorithm on the subgraph 77 or on each of the selected transport-service graphs which are included in the subgraph. The routing parameters 122 according to which the ranking is performed comprise an estimated travel duration 124 for a given route segment and a frequency of transportation options 126 on a given segment.

Typically, when performing the path-optimization algorithm, the edges of the graph on which it is performed are weighted according to the frequency of transportation options 126 and the estimated travel duration 124. To provide an example, the path-optimization algorithm chosen for the optimization could be Martin's variant of Dijkstra's algorithm.

In addition, user-preference parameters 121 regarding the usage and/or prohibition of specific transport services available for the routes are considered in the route selection. If such a user-preference parameter 121, for example, indicates "rail only" or "without air connections" correspondingly only routes with rail or only routes without air connections (plane etc.) are considered, other possible routes are dismissed. The user-preference parameters 121 are, for example, included in the request of the content requesting client 2.

The user-preference parameter 121 and the routing parameters 122 are in this example located on the same server D as the itinerary generator 11, which shows these data after the retrieval from external servers (in the case of the routing parameters) or from the user request (in the case of the user-preference parameter).

As a result of the overall ranking, a number of routes is discarded. The discarding may be performed by comparing the rank of a route with a given threshold value, which might be, in some example, set by the user. As such, for example, only the ten best routes are selected.

Said differently, the route module 8 transforms a set of routes 64 into a set of ranked routes 66 with a reduced number of routes in it, by discarding a plurality of routes in the course of the ranking. Alternatively, the path-optimization algorithm may be stopped as soon as a number of routes according to a given threshold has been generated, e.g. after generation of ten routes.

Only for the routes contained in this set of ranked routes 66, a set of itineraries 68 is created. An itinerary in the set of itineraries 68 comprises departure times and arrival times of segments of a route comprised by the set of ranked routes 66.

These departure and arrival times are a part of time data 32 queried from and subsequently retrieved from the content provider platform 3 via a provider interface 7. In addition, pricing data 34 and availability data 36 are also queried and retrieved from the content provider platform 3 in an analogous manner. In some embodiments, the availability of a given route segment is checked before the time data 32 is queried for the corresponding segment.

The provider interface 7 may be programmed so as to be able to gather data from a plurality of travel providers offering content in a plurality of different data types.

For each segment of a route comprised by the set of ranked routes 66 there is an estimated travel duration 124 available and the starting date of a journey is usually known from the client's request—an estimated departure and arrival time can be calculated for each segment. In some embodiments, the time data 32 for a segment is only gathered an estimated arrival time of a preceding segment onward. Hence, only calls to the content provider platform 3 have to be made that are around these estimated departure and arrival times.

As anyhow only calls for routes have to be made that are comprised by the set of ranked routes 66, this reduces the number of calls to be made to the content provider platform 3 even further.

Furthermore, pricing information 34 is retrieved for each route in the set of ranked routes 66, once the departure and arrival times have been determined for each route segment.

The set of ranked routes 66 together with the time data 32 (e.g. departure and arrival times) and the retrieved pricing data 34 (and availability data 36) forms the set of itineraries 68. The set of itineraries 68 is sent to the content requesting client 2 via the client interface 5 (see FIG. 1) in form of an offer.

In FIG. 3a a connection graph 88 and a metagraph 99, formed on the basis of the connection graph 88 are illustrated. The exemplary connection graph 88 shown in FIG. 3a comprises four transport-service graphs 81, 83, 85, 87. A first air-transport service graph 81 is illustrated by diamond-shaped nodes connected by edges and a second air-transport service graph 83 is illustrated by circle-shaped nodes connected by edges. Correspondingly, a first urban-transport transport service graph 85 is illustrated by triangular-shaped nodes connected by edges and a second urban-transport transport service graph 87 is illustrated by shield-shaped nodes connected by edges. The nodes represent stops in the transport-service network served by the transport operator (e.g. DB, Air France etc.). It is noted that for one and the same stop there can be a plurality of transport operators, each represented by a different node in the graph, as, for example, the same train stations could be served by a plurality of different rail operators (e.g. DB, Meridian etc.).

There are entry nodes/output nodes in the connection graph 88 that connect a transport-service graph 81, 83, 85, 87 to another transport-service graph 81, 83, 85, 87, such as nodes SP6 (entry node of transport service graph 85) and SP7 (output node of transport service graph 81). The entry/output node SP1, for example, is shared between air-transport service graph 81 and air transport-service graph 83 and serves therefore to connect those two air transport-service graphs 81, 82. In FIG. 3*a* this is illustrated by the half diamond and half-circular shape of node SP1. The node SP1 is shared between those graphs, as the graphs represent the same mode of transportation, namely air and are located at the same geographical position (GPS coordinates).

The entry/output nodes SP6 and SP7 connect air-transport service graph 81 to urban-transport transport service graph 85. The entry/output nodes SP2 and SP3 connect air-transportation service graph 83 to urban-transport transport service graph 85. The connection-nodes SP5 and SP4 connect air-transport service graph 83 to urban-transport service graph 87. These connections, also referred to as "connecting-edges" in the connection graph, represent, in some embodiments, walking episodes when changing from one transportation mode (here: air) to another (here: urban transport).

On the basis of the connection graph 88, a metagraph 99 is generated (the building/generation process is illustrated by arrow 89). The nodes of the metagraph represent the transport-service graphs of the connection graph 88. The edges of the metagraph represent connections between the transport-service graphs 81 (either by nodes shared, or by "connecting-edges" as described above). A list with all stops in a public-transportation network operated by the transport operator represented by a metagraph node 81', 83', 85', 87' of the metagraph 99 is associated with the corresponding metagraph node 81', 83', 85', 87'. This is illustrated in FIG. 3*a* by the lists besides the respective metagraph nodes 81', 83', 85', 87' to which hollow arrows point from those metagraph nodes 81', 83', 85', 87'. The illustrations of the lists include entry nodes/output nodes of the respective transport service graphs as representative list entries.

A high-level summary of obtaining a set of routes 64 from the connection graph 88 and a set of ranked routes 66 from the set of routes 64 is provided in the following:

First origin and destination nodes 40, 42 are identified, based on a travel origin and travel destination of the journey according to the request of the content requesting client 2 (not shown in FIG. 3*a*). Then it is identified, using the list containing all stops in a public-transport network operated by a specific transport operator, which is associated to a metagraph node, in which node of the metagraph the origin and destination nodes 40, 42 lie. In this example, the respective nodes are metagraph node 81' and metagraph node 87'.

Successively, possible metaroutes within the metagraph 99 are searched by a search algorithm executed on the metagraph 99. The purpose of this is to identify the public-transport networks, and the entry nodes and output nodes that are linking the public-transport networks together.

Figure 3B:
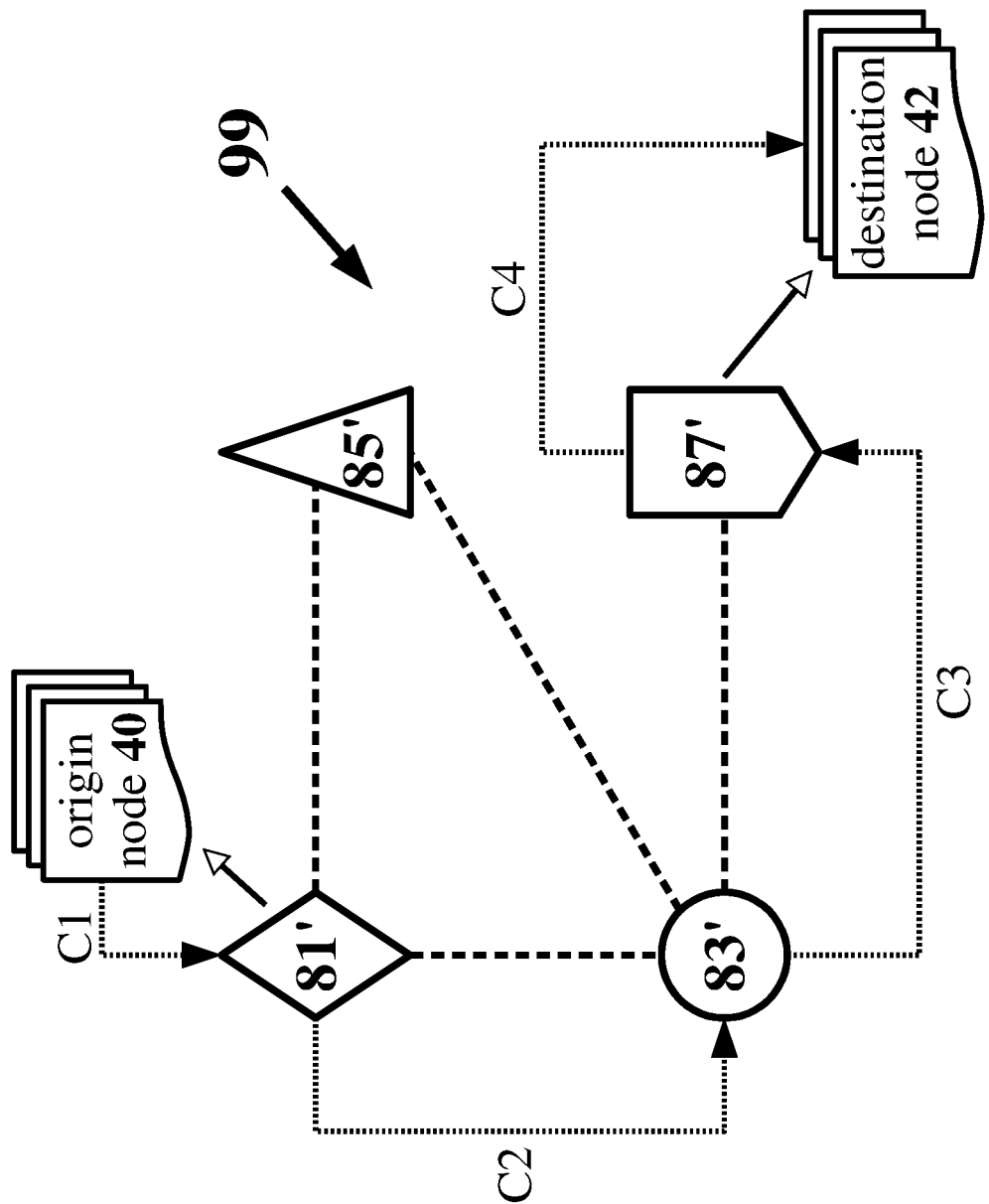
FIG. 3b illustrates tracing along the edges of an exemplary metagraph.

Traversing the metagraph 99 (searching the metagraph) is illustrated schematically in FIG. 3*b*: A path C2-C3 between metagraph-node 81', representing transport-service graph 81 and metagraph-node 87', representing transport-service graph 87 is found via the metagraph edges.

The metagraph edges represent options of change between two public-transportation networks, by either a connecting-edge in the connection graph 88 ("walking distance" between the two public transportation networks) or the two public transportation networks sharing a common stop (the nodes of the corresponding transport-service graphs have been merged).

The entire metaroute from the origin node 40 comprised by transport-service graph 81 to destination node 42 comprised by transport-service graph 87 goes from C1 (a route segment within transport-service graph 81) via C2 and C3 to C4 (a route segment within transport-service graph 87).

By the activity shown in FIG. 3*b*, the relevant metagraph nodes—and threreby the relevant transport-service graphs—are obtained. In some embodiments the metagraph-edges—indicating the option of changing between public transportation networks—have as an attribute the entry and output nodes of the corresponding transport-service graphs connected by those edges.

An example for a first possible path connecting the origin node 40 and the destination node 42 is:

Air-transport service network 81 (diamond-shaped nodes) →air-transport service network 83 (circular-shaped nodes) →urban-transport transport service graph 87 (shield-shaped nodes). This example covering three different transport service networks is illustrated by FIG. 3*b*.

Figure 3C:
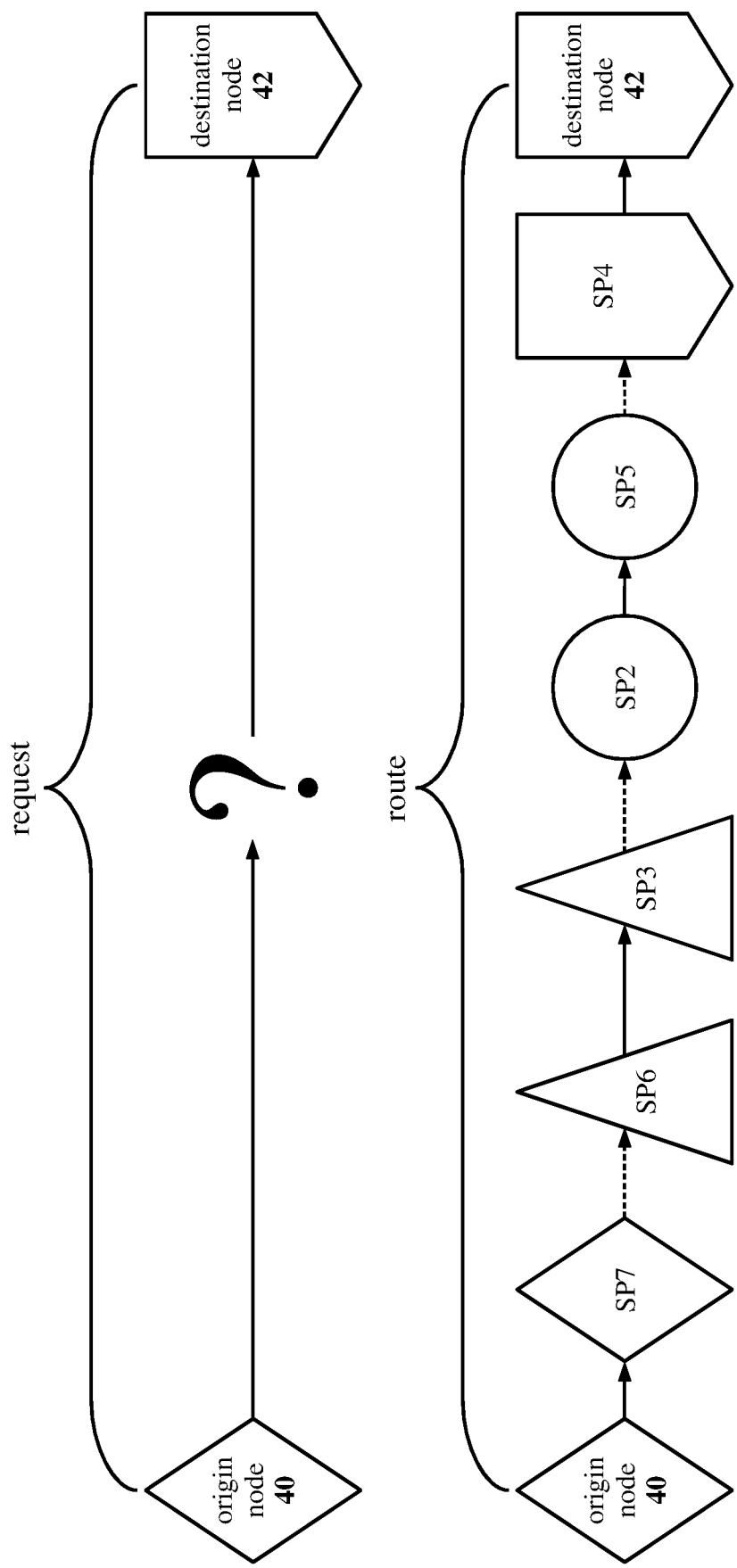

A second possible path is in this example:

Air-transport service network 81 (diamond-shaped nodes) →urban-transport service network 85 (triangle-shaped nodes)→air-transport service network 83 (circular-shaped nodes)→urban-transport transport service graph 87 (shield-shaped nodes). A route via the connection graph covering this path is illustrated by FIG. 3*c*.

The relevant nodes on the connection graph 88 are:
Origin node 40, node SP1; node SP7;
node SP1; node SP5; node SP2;
node SP6; node SP3;
node SP4; destination node 42;

Subgraphs 77 are formed according to the metaroutes. For the example given above, shown in FIG. 3*b*, the metaroute indicated by the paths C1, C2, C3, and C4 would lead to a subgraph 77 containing the transport-service graphs 81, 83, 87. Accordingly, metaroutes over additional and/or other metagraph nodes would lead to a subgraph 77 containing the corresponding transport-service graphs.

According to an embodiment, a path-optimization algorithm is applied to the subgraphs 77 according to the determined metaroutes. According to another embodiment, the path-optimization algorithm is applied to the transport-service graphs contained by a subgraph 77 individually.

In some embodiments, segments with a low frequency of transportation options (e.g. "air", "rail") are solved first and segments with higher frequency of transportation options (e.g. urban transportation like "Metro") are solved afterwards.

When routes for the first subgraph 77, based on the metaroute: air-transport service network 81→air-transport service network 83→urban-transport transport service graph 87 are ranked, a path-optimization algorithm solves the parts of the routes that lie in air-transport service network 81 and air transport services networks 83 first.

The second subgraph 77 is based on the metaroute: air-transport service graph 81→urban-transport transport-service graph 85→air-transport service graph 83→urban-transport transport service graph 87. The path-optimization algorithm solves the parts of the routes that lie in the air-transport service network 81 and the air-transport service network 83 first—with missing part—to be solved later—in the middle.

Transport-service segments (successive segments operated by the same transport operator) with low frequency of transportation options of the first subgraph 77 that are solved are:

Origin node 40→node SP1+node SP1→node SP1 (change from air-transport service graph 81 to air-transport service graph 83; considering transfer-time between the two networks)+node SP1→node SP5.

The transport-service segments for the second subgraph 77 run from origin node 40 to node SP7 and from node SP2 to node SP5, with a missing part—to be solved later—in the middle. Transport-service segments (successive segments operated by the same transport operator) with low frequency of transportation options of the second subgraph 77 that are solved are:

Origin node 40→node SP7+node SP7→node SP6 SP3 (not solved at this stage)+node SP3→node SP2+node SP2→node SP5

After solving these transport-service segments, the transport-service segments with a high frequency of transportation options, i.e. parts of the routes going over transportation service graphs 85, 87 (urban-transport), of the routes are solved.

The transport service segments required to come from origin node 40 to destination node 42 ("high frequency" and "low frequency") are agglomerated to a route.

By applying the path-optimization algorithm to the subgraph 77 (or the individual transport-service graphs of the subgraph 77) the set of routes 64 is obtained. In some examples, a ranking process is performed during the application of the algorithm to directly obtain a set of ranked routes 66. In another example, a separate ranking process is performed on the obtained set of routes 64 to rank and discard some of the routes and thereby obtain the set of ranked routes 66.

Figure 3D:
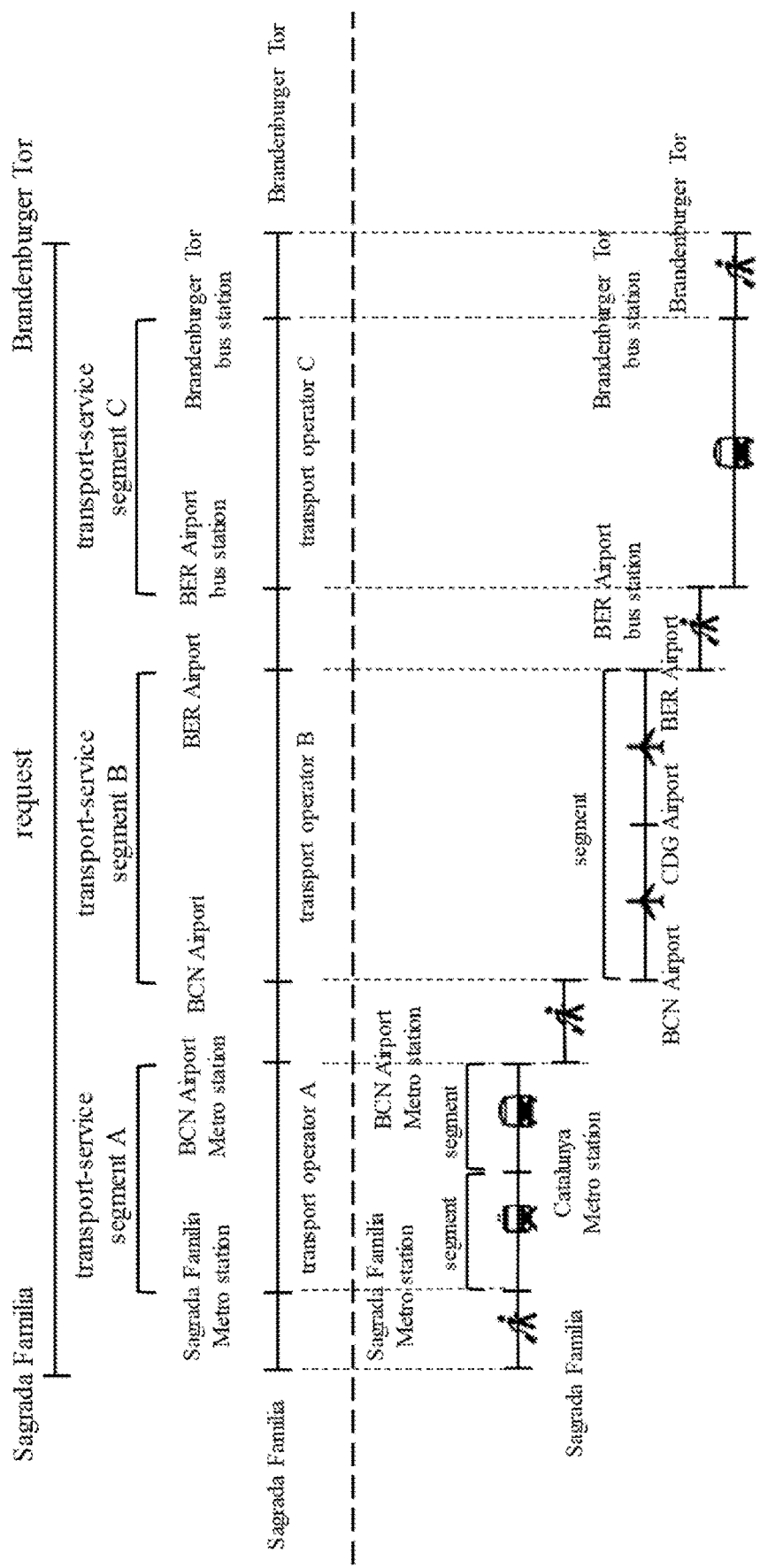
FIG. 3d illustrates an exemplary result of a route generating and itinerary finding process.

A real route as it could be obtained by the above described method is shown in FIG. 3d. The content requesting client defines a travel origin and a travel destination of a journey in a request sent by the client 2. In this example, the travel origin is the "Sagrada Familia" and the travel destination is the "Brandenburger Tor". From this travel origin and travel destination an origin node 40, which represents the stop "Sagrada Familia Metro station" and a destination node 42, which represent the stop "Brandenburger Tor bus station" is output from the selection. The route comprises a transport service segment A, which is served by the Barcelona urban transport service. The transport service segment A includes a Metro segment and a bus segment from the "Sagrada Familia Metro station" to the "BCN Airport Metro station", which are both operated by the transport operator A. Then there is a walking episode from the "BCN Airport Metro station" to the "BCN Airport", in a connection graph 88, this would have been represented by a connecting-edge. Then there is a transport-service segment B, which includes an air segment, covering a first flight from "BCN Airport" to "CDG Airport" and a second flight from "CDG Airport" to "BER Airport". The two flights are, e.g. both carried out by the same transport operator B, e.g. Lufthansa, Air France. There is another walking episode from "BER Airport" to "BER Airport bus station", which would have been also represented by a connecting-edge in a connection graph 88. From "BER Airport bus station" to "Brandenburger Tor bus station" there is a transport-service segment C, which a bus segment served by a Berlin urban transport service. From the "Brandenburger Tor bus station" to the "Brandenburger Tor" there is a final walking episode.

FIGS. 4a-4b show an excerpt of an exemplary xml-document that contains exemplary data used to generate the connection graph 88. This data, containing the stops, e.g. train stations or airports, and route links between the stop places in the requested network, is gathered from a content provider platform 3. The data also includes statistical data, such as frequency of transport options and estimated travel duration which are used as routing parameters 122 in the selection including the ranking. The stop places are transformed into nodes, the route links into edges. The statistical data are implemented as attributes of the edges. The excerpt of FIGS. 4a-4b provide information on two airports, Aeroport de Barcelona-El Prat and Amsterdam Airport Schipol, and their route links in one and the other direction. It can for example further be extracted from this xml-document that an average travel time between these airports by plane (corresponding to the estimated travel duration) is 145 minutes.

However, as a large variety of different standard and proprietary communication protocols, message exchange mechanisms, data types and formats as well as information exchanging applications lead to a heterogeneity in information exchange, the data gathered from the data content provider platform may have a different data format than needed to generate the connection graph.

Therefore, if the data gathered from a content provider platform does not conform to the data format required to build the connection graph 88, it is automatically transferred into a data format usable for the method. The data format shown in FIGS. 4a-4b is an XML format. For example, this format is used as other data types and formats can be easily transformed into this format.

Figure 5A:
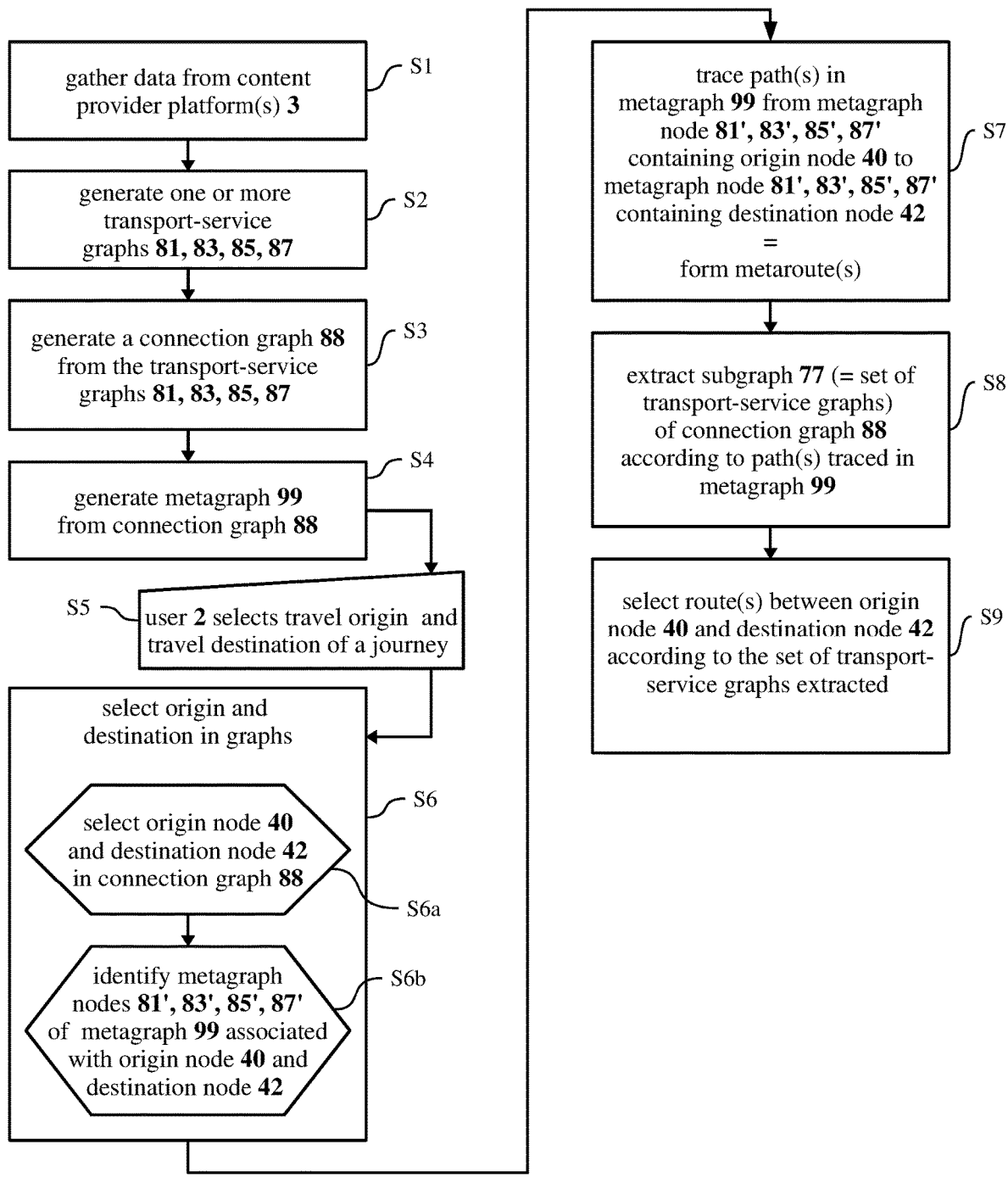
FIG. 5a is a flowchart illustrating an exemplary method of selecting routes.

A flow chart of an exemplary method of generating a set of routes based on data from a plurality of content provider platforms is shown in FIG. 5a.

In activity S1 data is gathered from content provider platforms 3. In activity S2 one or more transport-service graphs 81, 83, 85, 87 are generated. In activity S3, a connection graph 88 is generated from the transport-service graphs 81, 83, 85, 87 by connecting the transport-service graphs. In activity S4 a metagraph 99 is generated from connection graph 88.

In activity S5 a user 2 selects a travel origin and a travel destination of a journey. The selected travel origin and travel destination are typically part of the request sent by the user 2.

In activity S6 an origin and destination corresponding to the travel origin and travel origin provided by the content requesting client 2 are determined in the generated graphs (connection graph 88 and metagraph 99). Activity S6 comprises an activity S6a, namely selecting origin node 40 and destination node 42 in connection graph 88. As described above, the stops the represented by the origin node 40 and destination node 42 are typically public transport stations close to the travel origin and travel destination requested by the user 2. Activity S6 further comprises an activity 6b, namely identifying metagraph nodes 81', 87' (according to example illustrated in FIG. 3a) associated with the origin node 40 and the destination node 42 of the connection graph 88.

In activity S7 paths in the metagraph 99 are traced from a metagraph node containing the origin node 40 to the metagraph node containing the destination node 42. Thereby, metaroutes between origin and destination node are formed.

In activity S8, a subgraph 77 is extracted from the connection graph 88 according to the formed metaroutes.

In activity S9 routes are selected between the origin node 40 and destination node 42 by connecting origin node 40 and destination node 42 over edges of the subgraph 77.

Figure 5B:
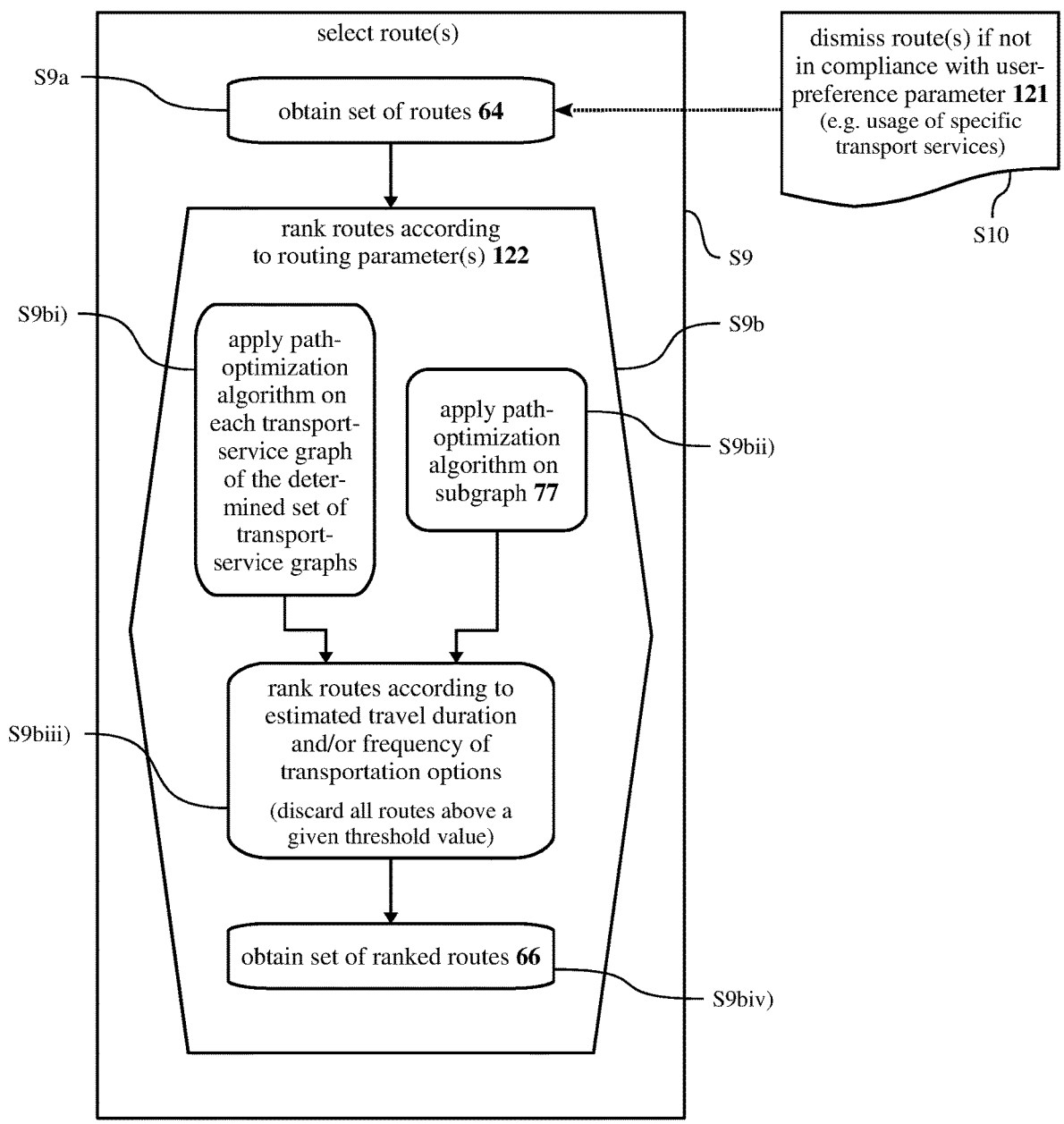
FIG. 5b shows the last step of the flowchart illustrated in FIG. 5a in more detail.

FIG. 5b shows activity S9 of FIG. 5a in more detail. Selecting the routes includes ranking routes according to routing parameters 122 (activity S9b). The routing parameters 122 comprise the estimated travel duration 124 and may further comprise other inputs.

Before the ranking, routes included in the set of routes 64, that was obtained in the activity S9a, that do not comply with user-preference parameters 121 (e.g. usage of specific transport service) are dismissed in conjunction with activity S10. They could, however, be dismissed in later activities also.

The activity S9b encompasses the application of a path-optimization algorithm, e.g. the above-mentioned Martin's algorithm. The activity S9bi) encompasses applying the path-optimization algorithm on each transport service graph of the determined set of transport service graphs contained in the subgraph 77. Alternatively, in activity S9bii) the path-optimization algorithm is applied on the subgraph 77.

Hence, the path-optimization algorithm can either be applied once on a large data set or several times on a plurality of smaller data sets., which ever may be more efficient to solve the problem.

By applying the path-optimization algorithm according to activities S9bi) or S9bii) the routes are ranked according to estimated travel duration and/or frequency of transportation options in activity S9biii). In an alternative embodiment, the routes are ranked by applying a single algorithm considering both the routing parameters 122 and the user-preference parameters 121.

The set of routes 64 is ranked up to a set threshold value, which might be given by the content requesting client 2 or preset in the algorithm. Routes with a rank higher than this threshold value are discarded.

Thereby a set of ranked routes 66—with a number of routes less than or equal to the set of routes 64—is obtained in activity S9biv).

Figure 6:
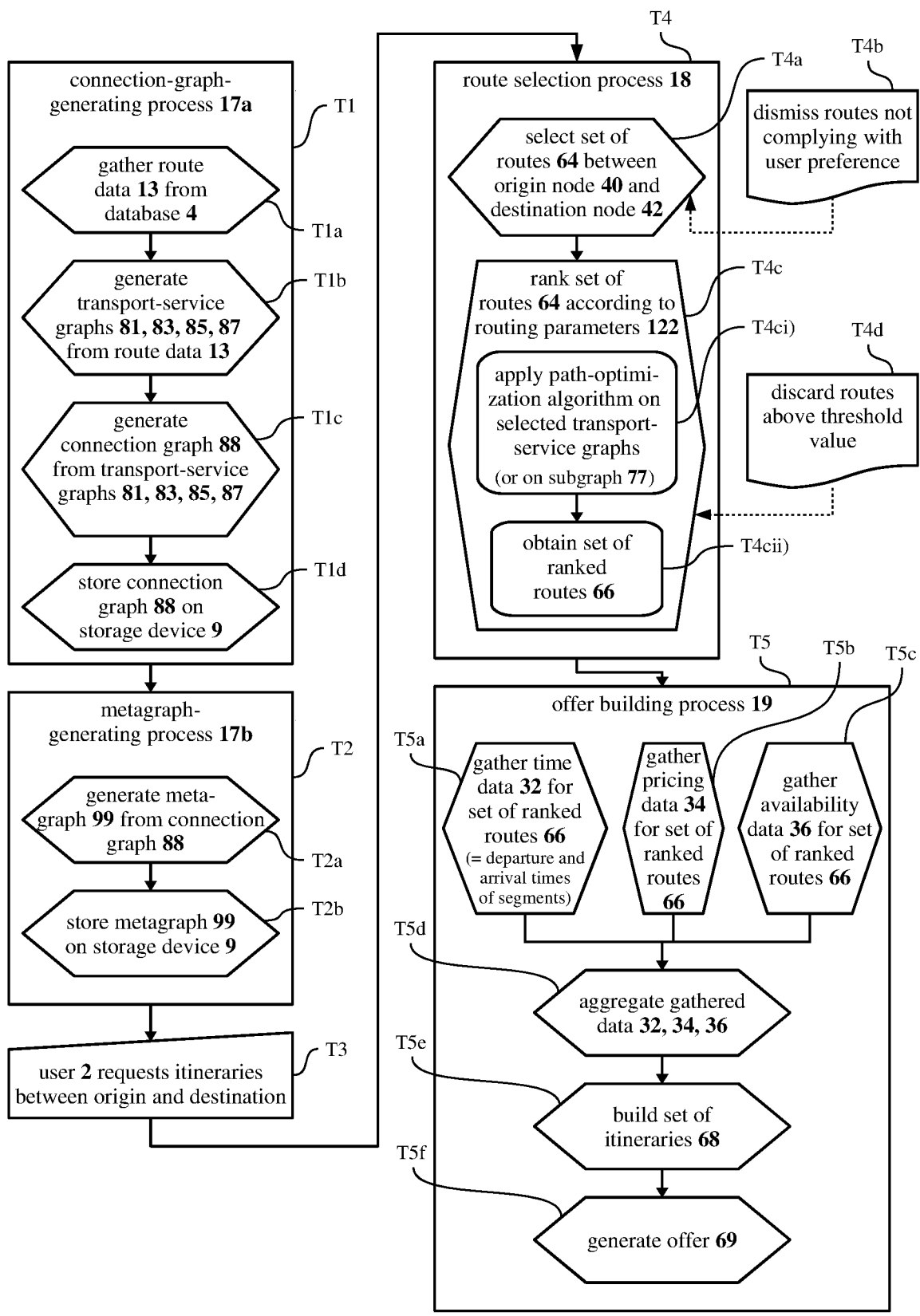
FIG. 6 is a flowchart illustrating the method of generating graphs, selecting routes and building an offer.

A flow chart of an exemplary method of graph generation and subsequent request handling, to obtain an offer including a set of itineraries according to the request sent by the content requesting client is shown in FIG. 6.

The graph generating process 17 executed by an instance of the route module 8 running on server B, according to the example shown in FIG. 1, is split into a connection-graph generating process 17a and a metagraph-generating process 17b illustrated in FIG. 6 by T1 and T2, respectively.

As a first activity T1, a connection-graph generating process 17a is performed. The connection-graph generating process comprises activities T1a to T1d. In activity T1a route data 13, comprising, for example, the names and locations of public transport stops in particular transportation service networks and information about connections between these stops, is gathered from a database 4. The route data 13 comprises, for example, statistical data, comprising estimated travel duration between stops represented by the graph's nodes. The route data 13 is typically gathered from an external database of, for example, a transport operator and/or a provider of statistical data. This data is retrieved, for example, only once at the beginning of the method and then whenever changes in the route data occur.

On the basis of this route data transportation-graphs 81, 83, 85, 87 are created in activity T1c. Each transportation service graph corresponds to the transportation service network of a specific transport operator, as mentioned above.

By connecting the transportation service graphs 81, 83, 85, 87 at stops at which a change between a first transportation service network represented by a first transport-service graph and a second transport-service network represented by second transport-service graph is possible, a connection graph 88 is thereby generated from the transportation service graphs 81, 83, 85, 87 in activity T1c. The connection graph 88 is stored on storage device 9 in activity T1d.

Subsequent to activity T1, which represents the connection-graph generating process 17a, a metagraph generating process 17b is performed in activity T2. The activity T2 comprises activities T2a and T2b. In activity T2a the metagraph 99 is generated from the connection graph 88. As described above, the metagraph nodes correspond to the transport service networks of the connection graph 88 and the edges of the metagraph correspond to the connections between these transport service networks. The metagraph 99 is, so to say an abstraction from the connection graph 88. Nevertheless, for example the the metagraph nodes may contain information such as a list of the stops contained in the transport service network the nodes represent. In activity T2b, the metagraph 99 is stored on the storage device 9.

In activity T3, the user 3 requests itineraries between origin and destination (which are, for example, actual places such as "Brandenburger Tor", "Sagrada Familia" as described above). As can be obtained from the flowchart, activities T1 and T2, i.e. the connection graph-generation process and the metagraph generation process are performed before a user sends a request.

In response to the user's 2 request, a route selection process 18 is performed in activity T4. The activity T4 comprises activities T4a and T4c. In activity T4a, a set of routes 64 between origin node 40 and destination node 42 is selected from the connection graph 88. Before this activity, routes that are not in compliance with a user-preference parameter, such as "rail only", "without flight", are dismissed in activity T4b. Activity T4b can be considered as a constraint applied on the selection activity T4a and is therefore illustrated outside the route selection process 18.

The user-preference parameter 121 is, for example, included in the user's request for itineraries The set of routes 64 is, for example, generated from the connection graph 88 (more specifically the subgraph 77) by traversing the metagraph 99 to find one or more metaroutes between a metagraph node that comprises a stop close to the user's 2 intended travel origin and a metagraph node that comprises a stop close to the user's 2 intended travel destination and also considering the user-preference parameters 121. In this example, only such parts of the connection graph 88 (=subgraph 77) are used to rank the selected routes that are part of the metaroutes.

By this metagraph traversal and the subsequent subgraph generation, the number of routes that are fed to the path-optimization algorithm in activitiy T4c is reduced (otherwise all the routes would have to be processed by this algorithm). Thus, the processing power required for the route selection is fundamentally reduced.

In activity T4c, the set of routes 64 is ranked according to a set of routing parameters 122. The ranking comprises a activity T4ci) which indicates applying a path-optimization algorithm on the selected transport-service graphs (or on subgraph 77). Prior to applying the path optimization algorithm, for example, the edges of the subgraph 77 or the selected transport-service graphs are weighted according estimated travel duration obtained from statistical data as contained in the route data 13. Besides the estimated travel duration, also the frequency of transport options between two stops represented by corresponding nodes in the respective graph, could be used in obtaining said weights. The estimated travel duration and frequency of transport options correspond to the routing parameters 122 in this example.

B applying the path-optimization algorithm, non-optimal routes (hence routes with a rank above a given threshold value, e.g. ten, i.e. routes with a rank of eleven or higher, are discarded by activity T4d.

Finally, in activity T4cii) an optimized set of routes 66 is obtained.

Based on the set of ranked routes 66 a set of itineraries 68 is built according to activity T5. Activity T5 represents an building process 19, which encompasses activities T5a-T5f.

In activities T5a, T5b, T5c which are performed essentially simultaneously, time data 32 and pricing data 34 as well as availability data 36 is gathered for the set of ranked routes. In some embodiments, one of the retrieved data is gathered first, for example, the availability data 36 is checked first as for unavailable routes no pricing data and time data needs to be queried. In other embodiments, a different order of retrievals might be employed.

The timing data 32 gathered essentially corresponds to departure and arrival times associated with segments of the routes comprised by the set of optimized routes 66. When retrieving timing data 32 and pricing data 34, only data for the set of ranked routes 66 have to be obtained, not for all the routes in the original set of routes 64. Also, only such timing data 32 has to be obtained that is in compliance with the corresponding estimated travel duration from a preceding segment to a subsequent segment, as this estimated travel duration implies an estimated arrival time for a first segment and therefore also reduces the number of possible departure times for a second segment that connects to the first segment. The same is true for pricing data 34.

The gathered time data 32, pricing data 34 and availability data 36 are aggregated in activity T5d.

In activity T5e a set of itineraries 68 is generated based on the set of ranked routes 66 and the gathered data 32, 34, 36. An itinerary comprises a departure time for each segment of the travel and an arrival time for each segment of the travel as well as a price associated to the segment.

Finally, in activity T5f an offer 69, encompassing the set of itineraries is generated. In some embodiments, the itineraries of the set of itineraries 68 are sorted according to their total price (this corresponds to a re-ranking of the routes—in a sense of a roadway). To provide an example, an itinerary with a longer route (corresponding to a higher rank) but low price might be ranked lower (=better) in the final offer 69.

Figure 7:
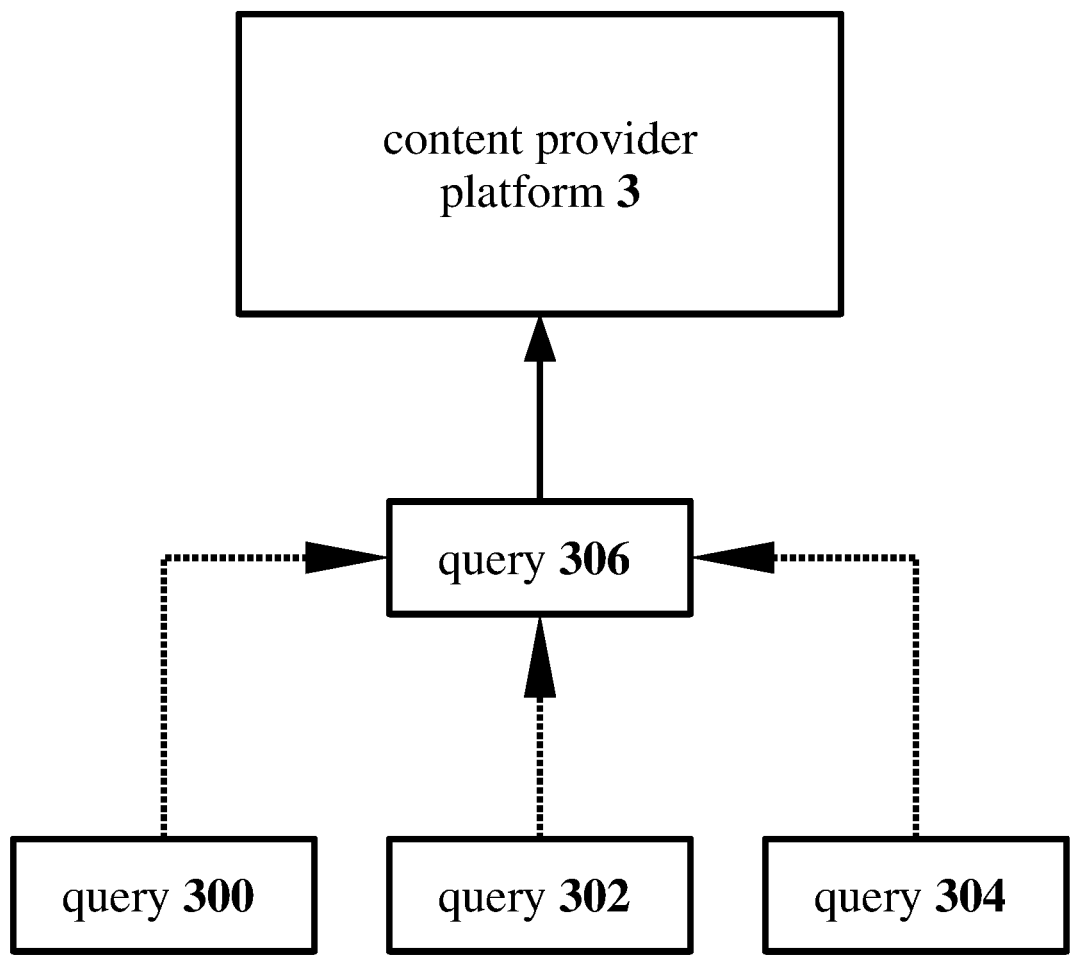
FIG. 7 shows the merging of queries directed to a single content provider platform.

FIG. 7 shows the merging of queries directed to a single content provider platform 3. In case that several queries 300, 302, 304 need to be directed to this single content provider platform 3, such as queries pertaining to time data 32, pricing data 34, availability data 36, those queries are joined to a single query 306, which is in turn sent to the corresponding content provider platform 3. Hence, data transfer to and from the external content provider platform 3 can be reduced, as less TCP packets are required. Furthermore, a single TCP connection can be used to process several queries at once.

Figure 8:
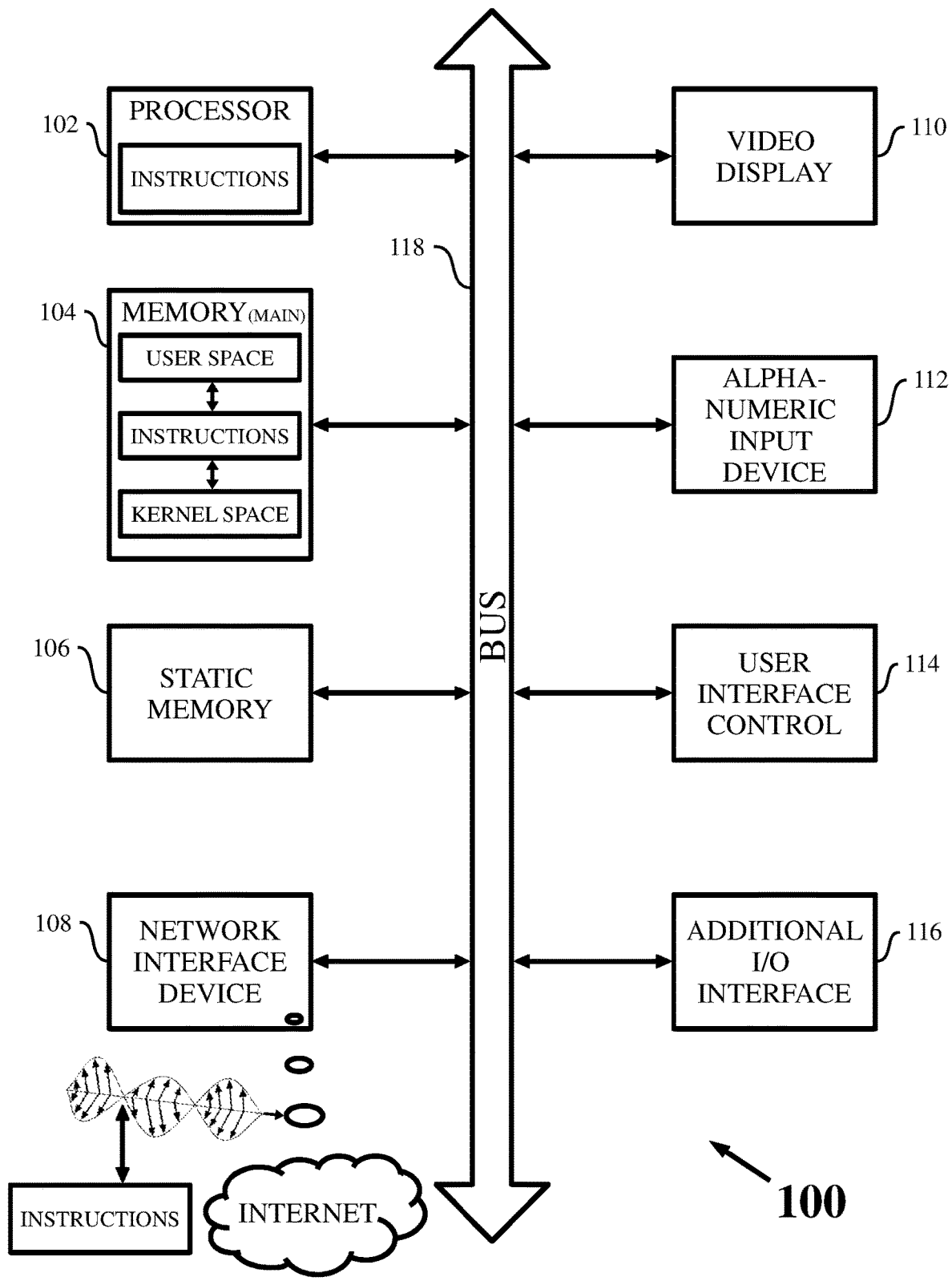
FIG. 8 illustrates an exemplary computer system according to the servers of FIG. 1.

A diagrammatic representation of an exemplary computer system 100 is shown in FIG. 8. The computer system 100 is arranged to execute a set of instructions on processor 102, to cause the computer system 100 to perform a task as described herein. The servers A, B, C and D could be computer systems as computer system 100.

The computer system 100 includes a processor 102, a main memory 104 and a network interface 108. The main memory 104 includes a user space, which is associated with user-run applications, and a kernel space, which is reserved for operating-system- and hardware-associated applications. The computer system 100 further includes a static memory 106, e.g. non-removable flash and/or solid-state drive and/or a removable Micro or Mini SD card, which permanently stores software enabling the computer system 100 to execute functions of the computer system 100. Furthermore, it may include a video display 110, a user interface control module 114 and/or an alpha-numeric and cursor input device 112. Optionally, additional I/O interfaces 116, such as card reader and USB interfaces may be present. The computer system components 102 to 109 are interconnected by a data bus 118.

In some examples the software programmed to carry out the method described herein is stored on the static memory 106; in other examples external databases are used. The graph-generating process 17, the route selecting process 18 and the offer building process 19 are, for example, processed by the servers B and D as illustrated in FIG. 1 and the routing parameters and route data are transmitted over a propagated waveform via the network interface device 108 to the servers A and D.

An executable set of instructions (i.e. software) embodying any one, or all, of the methodologies described above, resides completely, or at least partially, permanently in the non-volatile memory 106. When being executed, process data resides in the main memory 104 and/or the processor 102. The executable set of instructions causes the processor to perform anyone of the methods described above.

Figure 9:
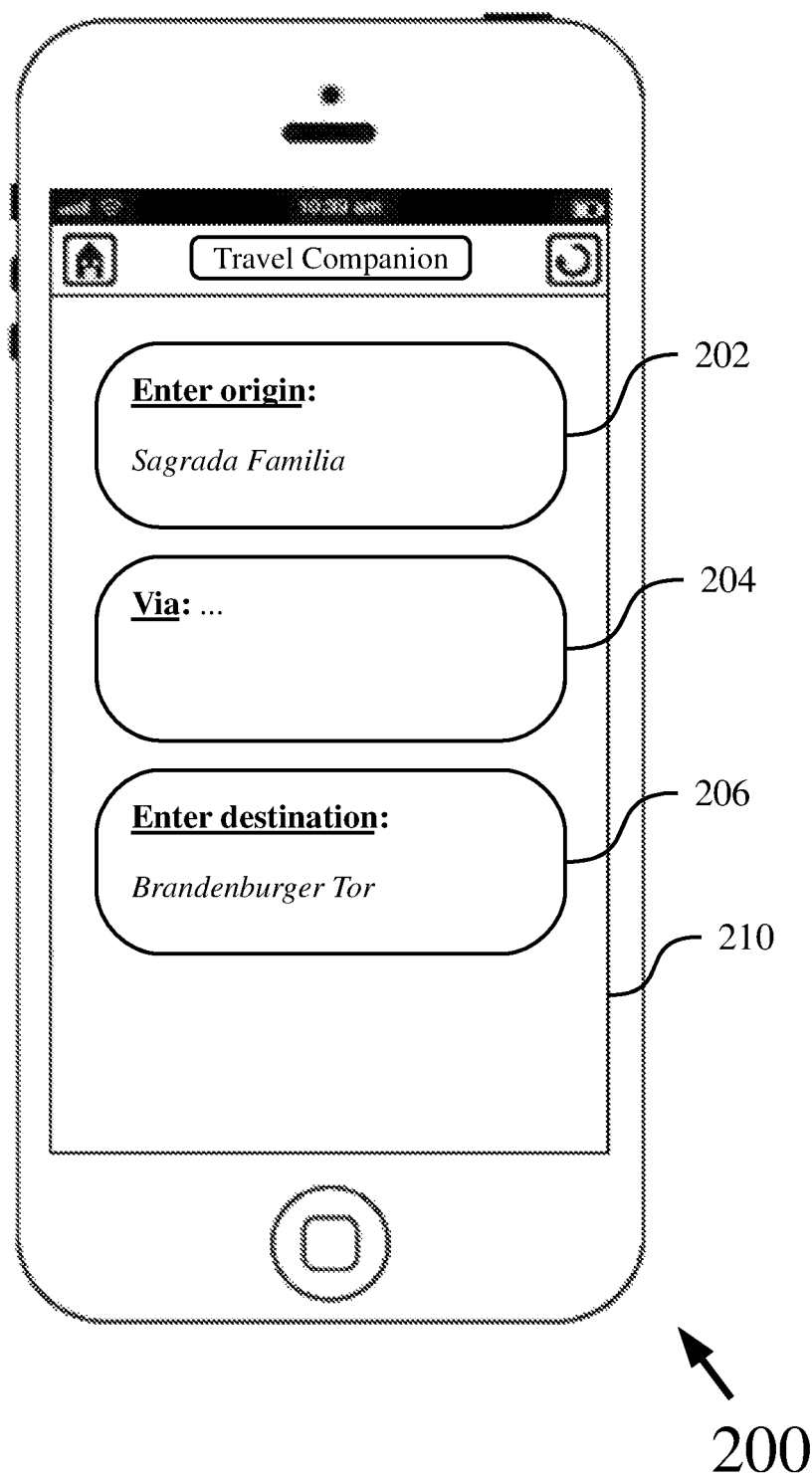
FIG. 9 illustrates an exemplary hand-held device.

FIG. 9 illustrates a handheld device 200, such as a tablet or mobile phone. On this handheld device 200, an application is running in which the user 2 enters the origin and the destination of his desired journey in an origin field 202 and a destination field 206 shown on the display 210 of the handheld device 200. The origin is in this example "Sagrada Familia" and the destination is "Brandenburger Tor". Also, a desired intermediate stop be entered in the field "Via" 204 Through the app "Travel Companion" the request is sent to trigger the processes as described above. A set of itineraries is sent to the handheld device 200 of the user 2 by the distributed computer system 100 when the methods described above are executed on the distributed computer system 100. The set of itineraries is displayed to the user 2 on a display 210 of the handheld device 200.

Please note that a user request could be sent from any device capable of sending a request, including also home PC's etc. The mentioning of a handheld device is not to be considered in a limiting sense.

The invention claimed is:

1. A method of handling a request at a computing system from a client computing device, the method comprising:
(A) at the computing system, via execution of a graph generating process prior to receipt of the request:
gathering data from a plurality of content provider platforms;
generating a plurality of transport-service graphs based on the gathered data, wherein each transport-service graph comprises a plurality of nodes and internal edges connecting the nodes; wherein the nodes represent stops in a corresponding public-transportation network and the internal edges represent connections between the stops;

generating a connection graph containing the plurality of transport-service graphs and including connection edges between nodes from distinct ones of the transport-service graphs;

generating a metagraph containing (i) a plurality of metagraph nodes each representing a respective one of the transport-service graphs, and (ii) metagraph edges connecting the metagraph nodes and corresponding to the connection edges;

storing the connection graph and the metagraph in a storage device;

(B) at the computing system, receiving the request from the client computing device, the request containing an origin, a destination, and at least one of a departure time and an arrival time;

(C) at the computing system, via execution of a route selecting process:

retrieving the metagraph from the storage device, and selecting a metaroute including a subset of the metagraph nodes, based on the origin and the destination;

retrieving a portion of the connection graph from the storage device corresponding to the selected metaroute, excluding a remainder of the connection graph, and selecting an origin node and a destination node in the retrieved portion of the connection graph according to the origin and destination, respectively; and selecting one or more routes between the origin node and the destination node comprising joining for a route a number of successive segments, a segment being a transportation connection between two nodes of a single transport-service graph by one or more internal edges;

(D) at the computing system, via execution of an offer building process:

sending at least one query asking a price and availability of a segment of the routes selected by the route selecting process to a respective content provider platform;

aggregating responses from the queried content provider platforms in order to build an itinerary for each route selected, thereby building a set of itineraries;

generating an offer comprising the set of itineraries; and sending the offer to the client computing device.

2. The method of claim 1, wherein the plurality of content provider platforms each being associated with at least one public-transportation network.

3. The method of claim 2, wherein each of the transport-service graphs corresponds to a public-transportation network operated by a transport operator with a given mode of transportation.

4. The method of claim 1, wherein each node is reachable by at least one of the other nodes through one or more internal edges.

5. The method of claim 1, wherein the estimated travel duration of segments is determined by the route module.

6. The method of claim 1, wherein selecting the one or more routes comprises ranking of the one or more routes according to at least one routing parameter, wherein the at least one routing parameter comprises the estimated travel duration for at least one segment of a selected route.

7. The method of claim 6, wherein the at least one routing parameter comprises a frequency of transportation options for at least one segment of a selected route.

8. The method of claim 1, wherein selecting the one or more routes comprises selecting routes with at least one of minimal estimated travel duration and maximal frequency of transportation options.

9. The method of claim 1, wherein the offer building process further comprises discarding a selected route in response to a segment of that route being unavailable.

10. The method of claim 1, wherein each metagraph node represents a transport-service graph and the metagraph edges represent options of changing from a first public-transportation network associated with a first transport-service graph to a second public-transportation network associated with a second transport-service graph.

11. The method of claim 10, wherein selecting the one or more routes comprises applying at least one path-optimization algorithm to at least one of the connection graph and the metagraph.

12. The method of claim 1, wherein selecting the one or more routes is based on at least one user-preference parameter.

13. The method of claim 12, wherein routes that are not in compliance with the at least one user-preference parameter are dismissed.

14. The method of claim 6, wherein the at least one routing parameter comprises a minimum interchange duration in-between two subsequent segments.

15. The method of claim 1, wherein a plurality of queries associated with one or more segments directed to a single content provider platform are grouped to a single query to the respective content provider platform.

16. A distributed computer system, comprising:

(A) a storage device;

(B) a first route module instance configured to:

gather data from a plurality of content provider platforms, generate a plurality of transport-service graphs based on the gathered data, wherein each transport-service graph comprises a plurality of nodes and internal edges connecting the nodes, wherein the nodes represent stops in a corresponding public-transportation network and the internal edges represent connections between the stops, generate a connection graph containing the plurality of transport-service graphs and including connection edges between nodes from distinct ones of the transport-service graphs;

generate a metagraph containing (i) a plurality of metagraph nodes each representing a respective one of the transport-service graphs, and (ii) metagraph edges connecting the metagraph nodes and corresponding to the connection edges; and store the connection graph and the metagraph in the storage device;

(C) a client interface arranged to receive a request from a client computing device, the request containing an origin, a destination, and at least one of a departure time and an arrival time;

(D) a second route module instance configured to:

retrieve the metagraph from the storage device, and select a metaroute including a subset of the metagraph nodes, based on the origin and the destination;

retrieve a portion of the connection graph from the storage device corresponding to the selected metaroute, excluding a remainder of the connection graph, and selecting an origin node and a destination node in the retrieved portion of the connection graph according to the origin and destination, respectively select one or more routes from the connection graph after the request from the content-requesting client is received, by joining for a route a number of successive segments, a segment being a transportation connection between two nodes of a single transport-service graph by one or more internal edges; and (E) an offer module configured to:

query at least one content provider platform for a price and availability of at least one segment of the routes selected, aggregate responses from the at least one queried content provider platform to build an itinerary for each route selected, thereby building a set of itineraries; and send the set of itineraries to the client computing device via the client interface.

17. The distributed computer system of claim 16, wherein the client interface is further arranged to communicate with a hand-held device operated by a content-requesting client.

18. The distributed computer system of claim 16, further comprising a provider interface arranged to exchange itinerary-oriented messages with the plurality of content provider platforms.

19. A computer program product comprising program code instructions stored on a computer readable medium, the instructions executable on a distributed computer system to:

gather data from a plurality of content provider platforms, generate a plurality of transport-service graphs based on the gathered data, wherein each transport-service graph comprises a plurality of nodes and internal edges connecting the nodes, wherein the nodes represent stops in a corresponding public-transportation network and the internal edges represent connections between the stops, generate a connection graph containing the plurality of transport-service graphs and including connection edges between nodes from distinct ones of the transport-service graphs;

generate a metagraph containing (i) a plurality of metagraph nodes each representing a respective one of the transport-service graphs, and (ii) metagraph edges connecting the metagraph nodes and corresponding to the connection edges; and store the connection graph and the metagraph in the storage device;

receive a request from a client computing device, the request containing an origin, a destination, and at least one of a departure time and an arrival time retrieve the metagraph from the storage device, and select a metaroute including a subset of the metagraph nodes, based on the origin and the destination;

retrieve a portion of the connection graph from the storage device corresponding to the selected metaroute, excluding a remainder of the connection graph, and selecting an origin node and a destination node in the retrieved portion of the connection graph according to the origin and destination, respectively select one or more routes from the connection graph after the request from the content-requesting client is received, by joining for a route a number of successive segments, a segment being a transportation connection between two nodes of a single transport-service graph by one or more internal edges query at least one content provider platform for a price and availability of at least one segment of the routes selected, aggregate responses from the at least one queried content provider platform to build an itinerary for each route selected, thereby building a set of itineraries; and send the set of itineraries to the client computing device via the client interface.

* * * * *